United States Patent
Miyakoshi et al.

(10) Patent No.: US 10,703,169 B2
(45) Date of Patent: Jul. 7, 2020

(54) VEHICLE AIR CONDITIONER

(71) Applicant: Sanden Holdings Corporation, Isesaki-shi, Gunma (JP)

(72) Inventors: Ryo Miyakoshi, Isesaki (JP); Kenichi Suzuki, Isesaki (JP)

(73) Assignee: Sanden Holdings Corporation, Isesaki-shi, Gunma (JP)

(*) Notice: Subject to any disclaimer, the term of this patent is extended or adjusted under 35 U.S.C. 154(b) by 179 days.

(21) Appl. No.: 15/875,674

(22) Filed: Jan. 19, 2018

(65) Prior Publication Data

US 2018/0141409 A1    May 24, 2018

Related U.S. Application Data

(62) Division of application No. 14/913,264, filed as application No. PCT/JP2014/071835 on Aug. 21, 2014, now Pat. No. 10,239,382.

(30) Foreign Application Priority Data

Aug. 23, 2013    (JP) ................. 2013-173235

(51) Int. Cl.
| | |
|---|---|
| *B60H 1/00* | (2006.01) |
| *F25B 49/02* | (2006.01) |
| *B60H 1/22* | (2006.01) |
| *F25B 5/04* | (2006.01) |
| *F25B 6/04* | (2006.01) |
| *F25B 40/00* | (2006.01) |

(52) U.S. Cl.
CPC ..... *B60H 1/00785* (2013.01); *B60H 1/00385* (2013.01); *B60H 1/00921* (2013.01);
(Continued)

(58) Field of Classification Search
CPC ............ B60H 1/00785; B60H 1/00878; B60H 1/00385; B60H 1/00921; F25B 49/02;
(Continued)

(56) References Cited

U.S. PATENT DOCUMENTS

| | | | |
|---|---|---|---|
| 2013/0068443 A1 | 3/2013 | Yen et al. | |
| 2013/0291577 A1* | 11/2013 | Miyakoshi | ......... B60H 1/00392 62/151 |
| 2015/0276290 A1* | 10/2015 | Aoyama | ................. F25B 13/00 62/115 |

FOREIGN PATENT DOCUMENTS

| | | |
|---|---|---|
| DE | 10 2010 025 779 A1 | 1/2011 |
| JP | S60-223940 A | 11/1985 |

(Continued)

OTHER PUBLICATIONS

English Translation of JP2011011686A.*
(Continued)

*Primary Examiner* — Marc E Norman
*Assistant Examiner* — Schyler S Sanks
(74) *Attorney, Agent, or Firm* — Baker Botts L.L.P.

(57) ABSTRACT

There is disclosed a vehicle air conditioner of a heat pump system in which there is prevented or inhibited frosting to an outdoor heat exchanger when heating in a vehicle interior is beforehand performed during plug-in, thereby realizing comfortable heating in the vehicle interior during running and also extending a running distance. The vehicle air conditioner includes a heating medium circulating circuit 23 to heat air to be supplied from an air flow passage 3 to a vehicle interior, a controller has frosting estimation means for estimating frosting to an outdoor heat exchanger 7, and when a heating mode is executed in a state where a power is supplied from an external power source to a compressor 2 or a battery which supplies the power to drive the compressor 2, the controller executes the heating by a heating medium circulating circuit 23, in a case where the frosting to the outdoor heat exchanger 7 is predicted on the basis of the estimation of the frosting estimation means.

4 Claims, 14 Drawing Sheets

(52) U.S. Cl.
CPC ............... *B60H 1/22* (2013.01); *F25B 49/02* (2013.01); *B60H 2001/00961* (2019.05); *F25B 5/04* (2013.01); *F25B 6/04* (2013.01); *F25B 40/00* (2013.01); *F25B 2341/0662* (2013.01); *F25B 2400/0403* (2013.01); *F25B 2400/0409* (2013.01); *F25B 2400/0411* (2013.01)

(58) Field of Classification Search
CPC .. F25B 2700/21175; F25B 2700/21151; F25B 47/00; F25B 47/02; F25B 47/006; F25B 2347/02; F25B 2700/11; F25D 21/02; F25D 21/00; F25D 21/04; F25D 21/06
See application file for complete search history.

(56) References Cited

FOREIGN PATENT DOCUMENTS

| | | | |
|---|---|---|---|
| JP | H09-142139 | A | 6/1997 |
| JP | 2001-324237 | A | 11/2001 |
| JP | 3985384 | B2 | 10/2007 |
| JP | 2008072034 | A * | 3/2008 |
| JP | 2011-011686 | A | 1/2011 |
| JP | 2011011686 | A * | 1/2011 |
| JP | 2011-020477 | A | 2/2011 |
| JP | 2012-176658 | A | 9/2012 |
| JP | 2013-139252 | A | 7/2013 |
| WO | WO-2012098966 | A1 * | 7/2012 ......... B60H 1/00392 |

OTHER PUBLICATIONS

English Translation of JP2008072034A.*
The State Intellectual Property Office of Peoples Republic of China, First Office Action for Chinese Application No. 2014800466705, dated Dec. 2, 2016.
Japan Patent Office, First Notification of Reasons for Refusal for Patent Application No. JP 2013-173235, dated Jun. 6, 2017.
German Patent and Trade Mark Office, Office Action issued in German Patent Application No. DE 11 2014 003 874.1, dated Apr. 21, 2020.

\* cited by examiner

VEHICLE AIR CONDITIONER

CROSS-REFERENCE TO RELATED APPLICATIONS

The present application is a divisional of U.S. patent application Ser. No. 14/913,264, which was filed on Feb. 19, 2016, which is a U.S. National Stage Patent Application under 37 U.S.C. § 371 of International Patent Application No. PCT/JP2014/071835, filed on Aug. 21, 2014, which claims the benefit of Japanese Patent Application No. JP 2013-173235, filed on Aug. 23, 2013, the disclosures of which are incorporated herein by reference in their entirety.

TECHNICAL FIELD

The present invention relates to an air conditioner of a so-called heat pump system which conditions air in a vehicle interior of a vehicle, and more particularly, it relates to an air conditioner of a hybrid car or an electric car to which a power can be supplied from an external power source.

Background Art

Due to actualization of environmental problems in recent years, hybrid cars and electric cars have spread. Furthermore, as an air conditioner which is applicable to such a vehicle, there has been developed an air conditioner which includes a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside the vehicle interior to let the refrigerant radiate or absorb heat, and which changes and executes respective modes such as a heating mode in which the refrigerant discharged from the compressor radiates heat in the radiator and the refrigerant by which heat has been radiated in this radiator absorbs heat in the outdoor heat exchanger, a dehumidifying mode in which the refrigerant discharged from the compressor radiates heat in the radiator and the refrigerant by which heat has been radiated in the radiator absorbs heat in the heat absorber, and a cooling mode in which the refrigerant discharged from the compressor radiates heat in the outdoor heat exchanger and absorbs heat in the heat absorber (e.g., see Patent Document 1).

Additionally, an electric car or part of hybrid cars is connected to an external power source (a charger) installed at home or in a power supply facility (a power supply point), whereby a battery can be charged (so-called plug-in). When the battery is charged by such plug-in, the present invention can contribute to fuel efficiency improvement especially in the hybrid car.

CITATION LIST

Patent Documents

Patent Document 1: Japanese Patent No. 3985384

SUMMARY OF THE INVENTION

Problems to be Solved by the Invention

Here, when a compressor is driven during running, a power of a battery is wasted. Therefore, when a vehicle interior is beforehand heated (preliminary air conditioning) before the running in a connected state to an external power source (a plug-in state), it is possible to extend the subsequent running distance.

However, in the above heating mode, an outdoor heat exchanger functions as an evaporator of a refrigerant. Therefore, when the compressor is operated directly or via the battery by the external power source during plug-in to execute the heating mode, water in outdoor air adheres as frost to the outdoor heat exchanger depending on conditions of a temperature/humidity of the outdoor air, and grows therein. In a case where frosting to the outdoor heat exchanger occurs in the heating mode, the frost becomes an insulating material, a heat exchange performance with the outdoor air therefore remarkably deteriorates, heat cannot be absorbed from the outdoor air, and a required heating capability cannot be obtained.

When the running starts in such a state, compressor operation time for the heating during the running lengthens to increase power consumption. Additionally, an auxiliary electric heater has to be used to complement the heating capability, and hence, the power consumption increases in any case, thereby causing the problem that the running distance is shortened.

The present invention has been developed to solve such a conventional technical problem, and an object thereof is to provide a vehicle air conditioner of a so-called heat pump system in which there is prevented or inhibited frosting to an outdoor heat exchanger when heating in a vehicle interior is beforehand performed during plug-in, thereby realizing comfortable heating in the vehicle interior during running and also extending a running distance.

Means for Solving the Problems

A vehicle air conditioner of the present invention includes a compressor which compresses a refrigerant; an air flow passage through which air to be supplied to a vehicle interior flows; a radiator which lets the refrigerant radiate heat to heat the air to be supplied from the air flow passage to the vehicle interior; a heat absorber which lets the refrigerant absorb heat to cool the air to be supplied from the air flow passage to the vehicle interior; an outdoor heat exchanger disposed outside the vehicle interior to let the refrigerant radiate heat or absorb heat; and control means, and the vehicle air conditioner executes at least a heating mode in which this control means lets the refrigerant discharged from the compressor radiate heat in the radiator, decompresses the refrigerant by which heat has been radiated, and then lets the refrigerant absorb heat in the outdoor heat exchanger, and the vehicle air conditioner includes auxiliary heating means for heating the air to be supplied from the air flow passage to the vehicle interior, the vehicle air conditioner being characterized in that the control means has frosting estimation means for estimating frosting to the outdoor heat exchanger, and when the heating mode is executed in a state where a power is supplied from an external power source to the compressor or a battery which supplies the power to drive the compressor, the control means executes the heating by the auxiliary heating means, in a case where the frosting to the outdoor heat exchanger is predicted on the basis of the estimation of the frosting estimation means.

The vehicle air conditioner of the invention of claim 2 is characterized in that in the above invention, the control means executes the heating by the radiator in a case where a heating capability by the auxiliary heating means runs short to a required heating capability Qtgt.

The vehicle air conditioner of the invention of claim 3 is characterized in that in the above invention, the control means compares the required heating capability Qtgt with a maximum heating capability generable by the auxiliary heating means, and complements the shortage of the maximum heating capability from the required heating capability Qtgt by the heating of the radiator.

The vehicle air conditioner of the invention of claim 4 is characterized in that in the above invention, the control means controls the compressor so that a refrigerant evaporation temperature in the outdoor heat exchanger is lower than an outdoor air temperature and a difference between the temperatures is within a predetermined value.

The vehicle air conditioner of the invention of claim 5 is characterized in that in the above respective inventions, the control means executes the heating by the radiator without performing the heating by the auxiliary heating means, in a case where it is predicted that the outdoor heat exchanger is not frosted, on the basis of the estimation of the frosting estimation means.

The vehicle air conditioner of the invention of claim 6 is characterized in that in the above respective inventions, the frosting estimation means calculates a maximum heating capability predicted value without frosting TGQhpNfst which is a target value of the maximum heating capability generable by the radiator in a range in which the outdoor heat exchanger is not frosted, and the frosting estimation means predicts that the outdoor heat exchanger is frosted in a case where the maximum heating capability predicted value without frosting TGQhpNfst is smaller than the required heating capability Qtgt or a value close to the required heating capability Qtgt.

The vehicle air conditioner of the invention of claim 7 is characterized in that in the above invention, the frosting estimation means calculates the maximum heating capability predicted value without frosting TGQhpNfst on the basis of an outdoor air temperature, or time, solar radiation, a rainfall, a location and weather conditions in addition to the outdoor air temperature.

The vehicle air conditioner of the invention of claim 8 is characterized in that in the inventions of claim 1 to claim 5, the frosting estimation means calculates a required refrigerant evaporation temperature in non-frosting TXObaseQtgt which is a refrigerant evaporation temperature of the outdoor heat exchanger when the required heating capability Qtgt is achieved, and the frosting estimation means predicts that the outdoor heat exchanger is frosted in a case where the required refrigerant evaporation temperature in non-frosting TXObaseQtgt is lower than a frost point Tfrost or a temperature close to the frost point Tfrost.

The vehicle air conditioner of the invention of claim 9 is characterized in that in the above invention, the frosting estimation means calculates the required refrigerant evaporation temperature in non-frosting TXObaseQtgt on the basis of the outdoor air temperature and the required heating capability Qtgt.

The vehicle air conditioner of the invention of claim 10 is characterized in that in the above respective inventions, the auxiliary heating means is constituted of a heating medium circulating circuit which has a heating medium-air heat exchanger to heat the air to be supplied from the air flow passage to the vehicle interior, an electric heater, and circulating means and which circulates a heating medium heated by the electric heater through the heating medium-air heat exchanger by the circulating means.

Advantageous Effect of the Invention

According to the present invention, a vehicle air conditioner includes a compressor which compresses a refrigerant; an air flow passage through which air to be supplied to a vehicle interior flows; a radiator which lets the refrigerant radiate heat to heat the air to be supplied from the air flow passage to the vehicle interior; a heat absorber which lets the refrigerant absorb heat to cool the air to be supplied from the air flow passage to the vehicle interior; an outdoor heat exchanger disposed outside the vehicle interior to let the refrigerant radiate heat or absorb heat; and control means, and the vehicle air conditioner executes at least a heating mode in which this control means lets the refrigerant discharged from the compressor radiate heat in the radiator, decompresses the refrigerant by which heat has been radiated, and then lets the refrigerant absorb heat in the outdoor heat exchanger, and the vehicle air conditioner includes auxiliary heating means for heating the air to be supplied from the air flow passage to the vehicle interior, the vehicle air conditioner being characterized in that the control means has frosting estimation means for estimating frosting to the outdoor heat exchanger, and when the heating mode is executed in a state where a power is supplied from an external power source to the compressor or a battery which supplies the power to drive the compressor, the control means executes the heating by the auxiliary heating means, in a case where the frosting to the outdoor heat exchanger is predicted on the basis of the estimation of the frosting estimation means. Therefore, when the vehicle interior is beforehand heated (preliminary air conditioning) during so-called plug-in, the auxiliary heating means performs vehicle interior heating while preventing or inhibiting the frosting to the outdoor heat exchanger, and it is possible to decrease loads during the subsequent running.

In consequence, it is possible to extend a running distance of an electric car or a hybrid car while maintaining the vehicle interior after start of running at a comfortable temperature.

In this case, as in the invention of claim 2, the control means executes the heating by the radiator in a case where a heating capability by the auxiliary heating means runs short to a required heating capability Qtgt, so that it is possible to achieve so-called preliminary air conditioning (the heating) in a cold season or at night without hindrance. Additionally, in a case where the heating capability by the auxiliary heating means satisfies the required heating capability Qtgt, the compressor is not operated, and hence, the frosting to the outdoor heat exchanger can securely be prevented.

Furthermore, as in the invention of claim 3, the control means compares the required heating capability Qtgt with a maximum heating capability generable by the auxiliary heating means, and complements the shortage of the maximum heating capability from the required heating capability Qtgt by the heating of the radiator, so that it is possible to precisely achieve the complementing of the heating capability by the radiator.

Also in this case, as in the invention of claim 4, the control means controls the compressor so that a refrigerant evaporation temperature in the outdoor heat exchanger is lower than an outdoor air temperature and a difference between the temperatures is within a predetermined value, so that the frosting to the outdoor heat exchanger can effectively be prevented or inhibited.

Additionally, as in the invention of claim 5, the control means executes the heating by the radiator without performing the heating by the auxiliary heating means, in a case where it is predicted that the outdoor heat exchanger is not frosted, on the basis of the estimation of the frosting estimation means, so that it is possible to achieve saving of power consumption for the heating during so-called plug-in without hindrance.

Further, as in the invention of claim 6, the frosting estimation means calculates a maximum heating capability predicted value without frosting TGQhpNfst which is a target value of the maximum heating capability generable by the radiator in a range in which the outdoor heat exchanger is not frosted, and the frosting estimation means predicts that the outdoor heat exchanger is frosted in a case where the maximum heating capability predicted value without frosting TGQhpNfst is smaller than the required heating capability Qtgt or a value close to the required heating capability Qtgt, so that also in a case where a so-called frost point at which the outdoor heat exchanger is frosted cannot be detected, it is possible to effectively prevent or inhibit the frosting to the outdoor heat exchanger during the plug-in.

In this case, as in the invention of claim 7, the frosting estimation means calculates the maximum heating capability predicted value without frosting TGQhpNfst on the basis of an outdoor air temperature, or time, solar radiation, a rainfall, a location and weather conditions in addition to the outdoor air temperature. In consequence, the maximum heating capability predicted value without frosting TGQhpNfst at which the outdoor heat exchanger is not frosted can precisely be estimated. That is, as a result, the frost point can precisely be estimated, thereby making it possible to further effectively prevent or inhibit the frosting to the outdoor heat exchanger during the plug-in.

On the other hand, as in the invention of claim 8, the frosting estimation means calculates a required refrigerant evaporation temperature in non-frosting TXObaseQtgt which is a refrigerant evaporation temperature of the outdoor heat exchanger when the required heating capability Qtgt is achieved, and the frosting estimation means predicts that the outdoor heat exchanger is frosted in a case where the required refrigerant evaporation temperature in non-frosting TXObaseQtgt is lower than a frost point Tfrost or a temperature close to the frost point Tfrost. In consequence, it is possible to effectively prevent or inhibit the frosting to the outdoor heat exchanger during the plug-in on the basis of the frost point at which the outdoor heat exchanger is frosted.

In this case, as in the invention of claim 9, the frosting estimation means calculates the required refrigerant evaporation temperature in non-frosting TXObaseQtgt on the basis of the outdoor air temperature and the required heating capability Qtgt. In consequence, it is possible to precisely estimate the required refrigerant evaporation temperature in non-frosting TXObaseQtgt which achieves the required heating capability Qtgt when the outdoor heat exchanger is not frosted, and it is possible to further effectively prevent or inhibit the frosting to the outdoor heat exchanger during the plug-in.

Further, as in the invention of claim 10, the auxiliary heating means is constituted of a heating medium circulating circuit which has a heating medium-air heat exchanger to heat the air to be supplied from the air flow passage to the vehicle interior, an electric heater, and circulating means and which circulates a heating medium heated by the electric heater through the heating medium-air heat exchanger by the circulating means, thereby making it possible to achieve electrically safer vehicle interior heating.

MODE FOR CARRYING OUT THE INVENTION

Hereinafter, embodiments of the present invention will be described in detail with reference to the drawings.

Embodiment 1

Figure 1:
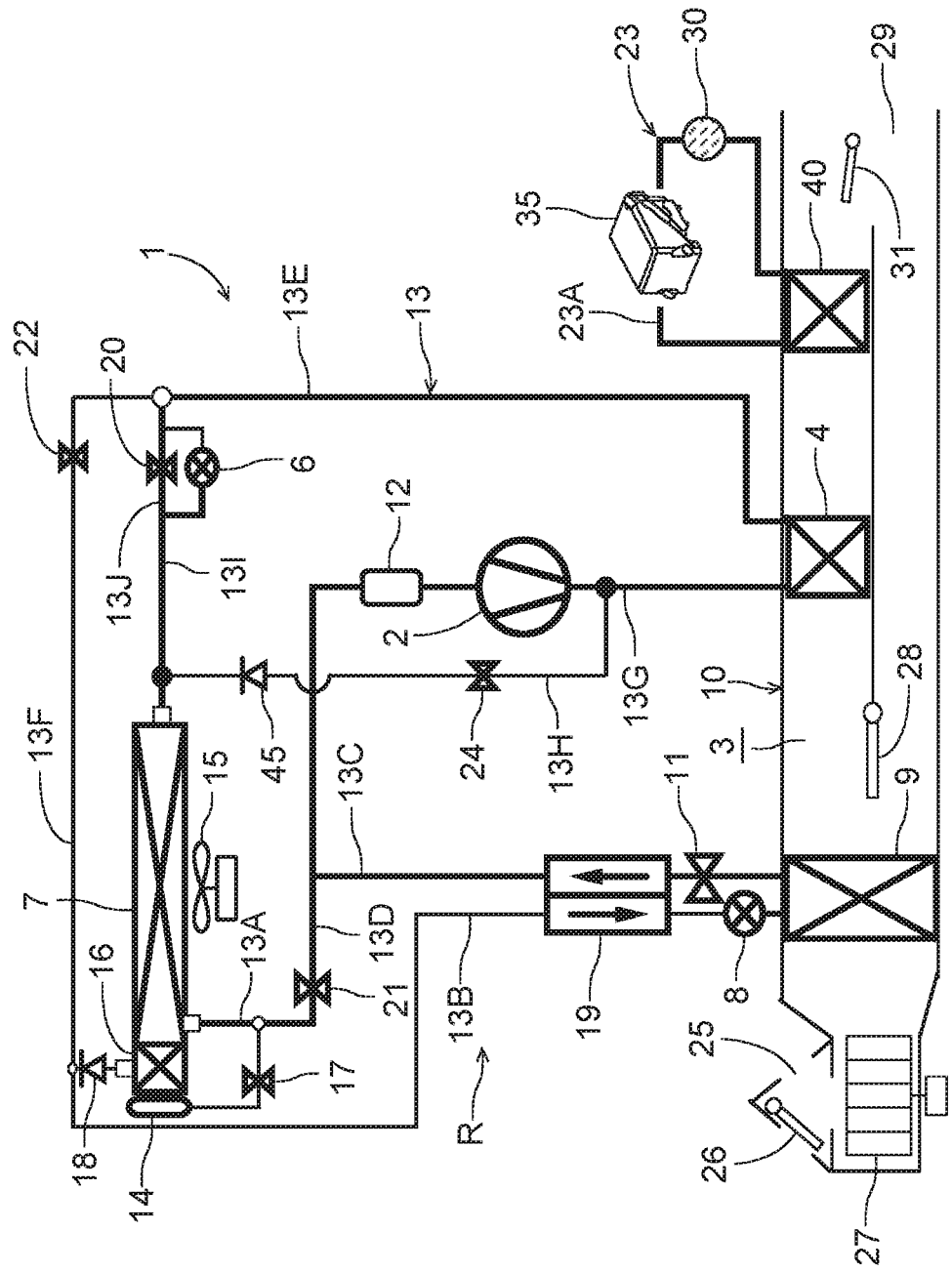
FIG. 1 is a constitutional view of a vehicle air conditioner of one embodiment to which the present invention is applied.

FIG. 1 shows a constitutional view of a vehicle air conditioner 1 of one embodiment of the present invention. A vehicle of the embodiment to which the present invention is applied is an electric car (EV) which does not have an engine (an internal combustion engine), and runs by driving an electric motor for running by a power charged (plug-in) in a battery from an external power source (which is not shown), and the vehicle air conditioner 1 of the present invention is also driven by the power of the battery. That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like.

It is to be noted that the vehicle is not limited to the electric car, and the present invention is also effective for a so-called hybrid car in which the engine is used together with the electric motor for the running and in which so-called plug-in to charge the battery from the external power source is possible.

The vehicle air conditioner 1 of the embodiment performs air conditioning (heating, cooling, dehumidifying, and ventilation) in a vehicle interior of the electric car, and there are successively connected, by a refrigerant pipe 13, an electric compressor 2 of an electric system which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 flow into the radiator via a refrigerant pipe 13G and radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, so that a refrigerant circuit R is constituted. It is to be noted that in the outdoor heat exchanger 7, an outdoor blower 15 is disposed. The outdoor blower 15 forcibly passes the outdoor air through the outdoor heat exchanger 7, thereby performing the heat exchange between the outdoor air and the refrigerant, and consequently, the outdoor air is passed through the outdoor heat exchanger 7 also when the vehicle is stopped (i.e., a velocity VSP is 0 km/h).

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and bypasses the outdoor expansion valve 6 to pass the refrigerant. Furthermore, the refrigerant pipe 13G on a discharge side of the compressor 2 is branched, this branched refrigerant pipe 13H is opened in a defrosting mode (a defrosting operation) of the outdoor heat exchanger 7, and the refrigerant pipe communicates to be connected to a refrigerant pipe 13I between a parallel circuit of the outdoor expansion valve 6 with the bypass pipe 13J and the outdoor heat exchanger 7 via a solenoid valve (an opening/closing valve) 24 and a check valve 45 disposed so that the high-temperature refrigerant (a hot gas) discharged from the compressor 2 directly flows into the outdoor heat exchanger 7. The solenoid valve 24 constitutes defrosting means. It is to be noted that a refrigerant pipe 13I direction of the check valve 45 is a forward direction.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in FIG. 1, 23 indicates a heating medium circulating circuit as auxiliary heating means disposed in the vehicle air conditioner 1 of the embodiment. The heating medium circulating circuit 23 includes a circulating pump 30 constituting circulating means, a heating medium heating electric heater (shown as an auxiliary HTR in the drawing) 35, and a heating medium-air heat exchanger 40 disposed in the air flow passage 3 on an air downstream side of the radiator 4 to the flow of the air of the air flow passage 3, and these components are successively annularly connected to one another by a heating medium pipe 23A. It is to be noted that as the heating medium to be circulated in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 is circulated through the heating medium-air heat exchanger 40. That is, the heating medium-air heat exchanger 40 of the heating medium circulating circuit 23 becomes a so-called heater core, and complements the heating in the vehicle interior. When the heating medium circulating circuit 23 is employed, electric safety of a passenger can improve.

Additionally, in the air flow passage 3 on the air upstream side of the radiator 4, an air mix damper 28 is disposed to adjust a degree of flow of the indoor air or the outdoor air through the radiator 4. Furthermore, in the air flow passage 3 on the air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
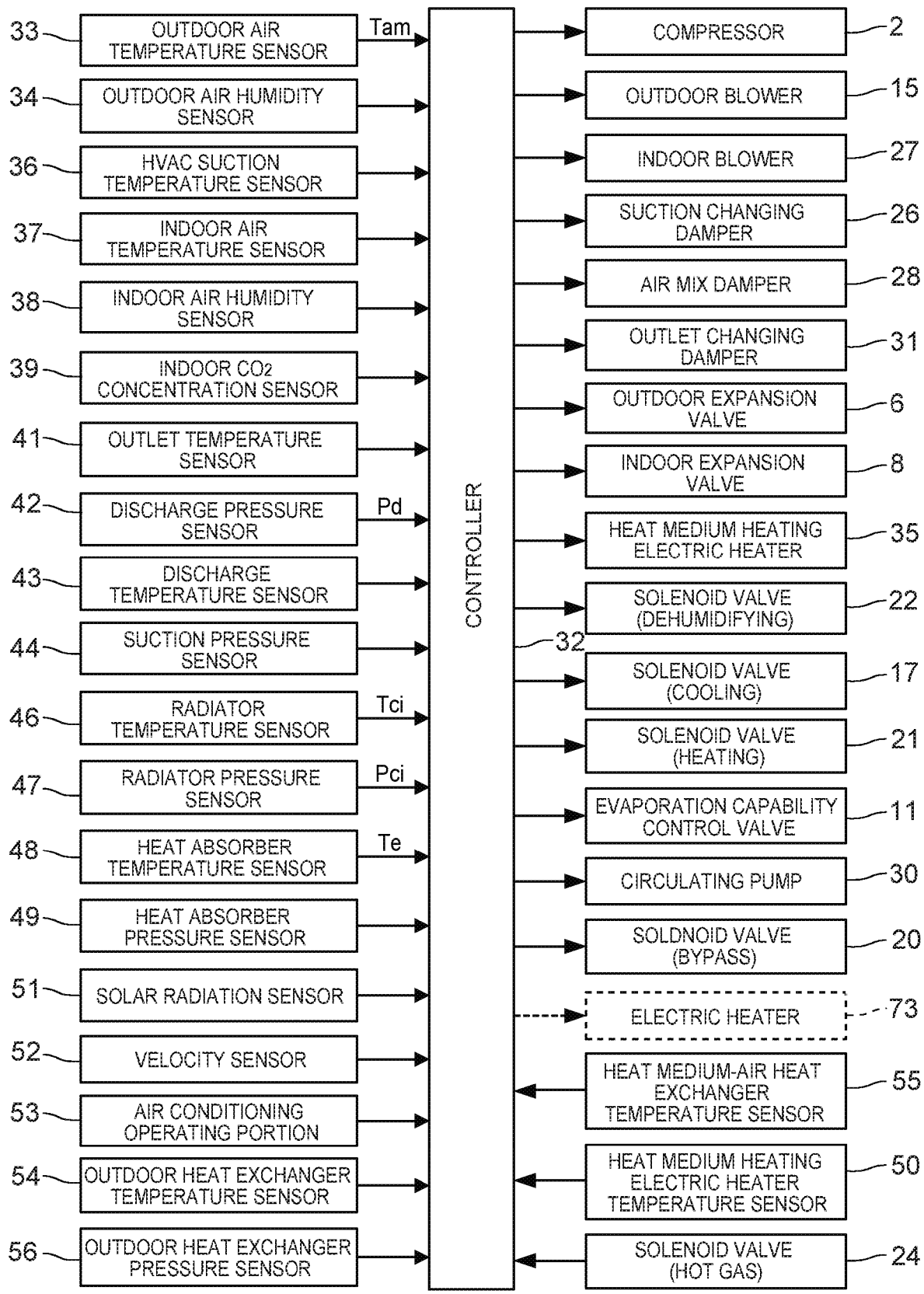
FIG. 2 is a block diagram of an electric circuit of a controller of the vehicle air conditioner of FIG. 1.

Next, in FIG. 2, 32 is a controller (ECU) as control means and frosting estimation means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of a heating medium heating electric heater temperature sensor 50 which detects a temperature of the heating medium heating electric heater 35 of the heating medium circulating circuit 23 (the temperature of the heating medium immediately after the heating medium is heated by the heating medium heating electric heater 35 or a temperature of an unshown electric heater itself included in the heating medium heating electric heater 35), and a heating medium-air heat exchanger temperature sensor 55 which detects a temperature of the heating medium-air heat exchanger 40 (the temperature of the air passed through the heating medium-air heat exchanger 40 or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21, 20 and 24, the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air conditioner 1 of the embodiment having the abovementioned constitution will be described. The controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22, the solenoid valve 20 and the solenoid valve 24. Further, the compressor 2 and the respective blowers 15 and 27 are operated, and the air mix damper 28 has a state where the air blown out from the indoor blower 27 is passed through the radiator 4 and the heating medium-air heat exchanger 40. In consequence, a high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. It is to be noted that an operation and a function of the heating medium circulating circuit 23 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump (shown by HP in the drawing), and the outdoor heat exchanger 7 functions as an evaporator of the refrigerant. Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29 through the heating medium-air heat exchanger 40, and hence the heating in the vehicle interior is performed.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed. The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22, the solenoid valve 20 and the solenoid valve 24. Further, the compressor 2 and the respective blowers 15 and 27 are operated, and the air mix damper 28 has the state where the air blown out from the indoor blower 27 is passed through the radiator 4 and the heating medium-air heat exchanger 40. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed. The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure Pci) of the radiator 4.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling)), and the air mix damper 28 has a state where the air is not passed through the radiator 4 and the heating medium-air heat exchanger 40. In consequence, the high-temperature high-pressure gas refrigerant discharged from the compressor 2 flows into the radiator 4. The air in the air flow passage 3 is not passed through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48.

(6) Heating Mode During Vehicle Running and Auxiliary Heating by Heating Medium Circulating Circuit (Auxiliary Heating Means) in the Heating Mode Next, there will be described control of the compressor 2 and the outdoor expansion valve 6 in the heating mode during the running of the vehicle (the electric car), and the auxiliary heating by the heating medium circulating circuit 23 in the heating mode.

(6-1) Control of Compressor and Outdoor Expansion Valve During Vehicle Running

The controller 32 calculates a target outlet temperature TAO from Equation (I) mentioned below. The target outlet temperature TAO is a target value of a temperature of air blown out from the outlet 29 to the vehicle interior.

$$TAO=(Tset-Tin) \times K+Tbal(f(Tset,SUN,Tam)) \quad (I),$$

in which Tset is a predetermined temperature in the vehicle interior which is set by the air conditioning operating portion 53, Tin is a temperature of the air in the vehicle interior which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes.

The controller 32 calculates a target radiator temperature TCO from the target outlet temperature TAO, and next calculates a target radiator pressure PCO on the basis of the target radiator temperature TCO. Further, on the basis of the target radiator pressure PCO and the refrigerant pressure (the radiator pressure) Pci of the radiator 4 which is detected by the radiator pressure sensor 47, the controller 32 calculates a number of revolution Nc of the compressor 2, and operates the compressor 2 at the number of revolution Nc. That is, the controller 32 controls the refrigerant pressure Pci of the radiator 4 in accordance with the number of revolution Nc of the compressor 2.

Additionally, the controller 32 calculates a target radiator subcool degree TGSC of the radiator 4 on the basis of the target outlet temperature TAO. On the other hand, the controller 32 calculates the subcool degree (a radiator subcool degree SC) of the refrigerant in the radiator 4 on the basis of the radiator pressure Pci and a temperature (a radiator temperature Tci) of the radiator 4 which is detected by the radiator temperature sensor 46. Further, on the basis of the radiator subcool degree SC and the target radiator subcool degree TGSC, the controller calculates a target valve position (a target outdoor expansion valve position TGECCV) of the outdoor expansion valve 6. Further, the controller 32 controls the valve position of the outdoor expansion valve 6 into the target outdoor expansion valve position TGECCV.

The controller 32 performs the calculation in such a direction as to raise the target radiator subcool degree TGSC, when the target outlet temperature TAO becomes higher, but the present invention is not limited to this embodiment, and the section may perform the calculation on the basis of an after-mentioned difference (a capability difference) between a required heating capability Qtgt and a heating capability Qhp, the radiator pressure Pci, or a difference (a pressure difference) between the target radiator pressure PCO and the radiator pressure Pci. In this case, the controller 32 lowers the target radiator subcool degree TGSC, when the capability difference becomes smaller, the pressure difference becomes smaller, an air volume of the indoor blower 27 becomes smaller or the radiator pressure Pci becomes smaller.

(6-2) Control of Heating Medium Circulating Circuit During Vehicle Running

Additionally, in a case where the controller 32 judges that the heating capability by the radiator 4 runs short in this heating mode, the controller energizes the heating medium heating electric heater 35 to generate heat, and operates the circulating pump 30, thereby executing the heating by the heating medium circulating circuit 23.

Figure 3:
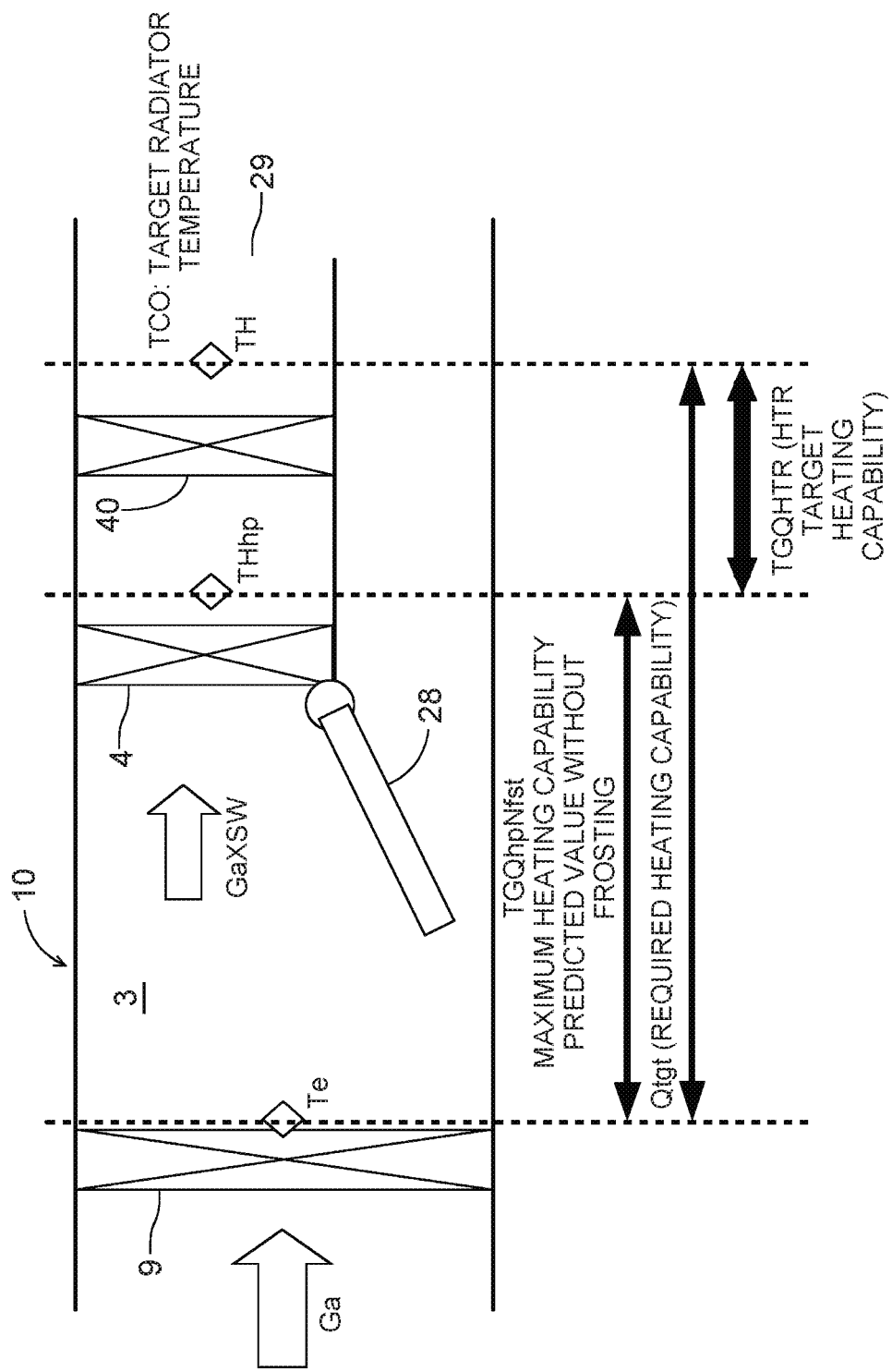
FIG. 3 is an enlarged view of an air flow passage portion of FIG. 1.

When the circulating pump 30 of the heating medium circulating circuit 23 is operated and the heating medium heating electric heater 35 is energized, the heating medium (the high-temperature heating medium) heated by the heating medium heating electric heater 35 as described above is circulated through the heating medium-air heat exchanger 40, and hence, the air passed through the radiator 4 of the air flow passage 3 is heated. FIG. 3 shows temperatures and the like of the respective components in the air flow passage 3 at this time. In this drawing, Ga is a mass air volume of the air flowing into the air flow passage 3, Te is a temperature of the heat absorber 9 which is detected by the heat absorber temperature sensor 48 (the temperature of the air flowing out from the heat absorber 9), Ga×SW is a value obtained by multiplying the mass air volume Ga by an opening of the air mix damper 28, THhp is a temperature of the air passed through the radiator 4 which is detected by the radiator temperature sensor 46 (an approximate radiator average temperature), TH is a temperature of the air passed through the heating medium-air heat exchanger 40 which is detected by the heating medium-air heat exchanger temperature sensor 55, and in the heating mode, a target value of the temperature of the air blown out from the heating medium-air heat exchanger 40 through the outlet 29 to the vehicle interior is the target radiator temperature TCO. It is to be noted that, when the heating medium circulating circuit 23 does not operate, TH=THhp.

Next, control of the heating medium circulating circuit 23 in the heating mode during the running of the vehicle will be described. The controller 32 calculates the required heating capability Qtgt as the heating capability of the radiator 4 which is required, by use of Equation (II) mentioned below, and the controller predicts and calculates a maximum heating capability predicted value without frosting TGQhpNfst which is a target value of a maximum heating capability generable by the radiator 4 in a range in which the outdoor heat exchanger 7 is not frosted, i.e., a target value of the maximum heating capability generable by the radiator 4 without frosting the outdoor heat exchanger 7 in a case where a heat pump operation is performed to let the refrigerant radiate heat in the radiator 4 and evaporate the refrigerant in the outdoor heat exchanger 7 under an environment where the vehicle is placed at present, by use of Equation (III).

$$Qtgt=(TCO-Te) \times Cpa \times \rho \times Qair \quad (II)$$

$$TGQhpNfst=f(Tam) \quad (III),$$

in which Tam is the abovementioned outdoor air temperature detected by the outdoor air temperature sensor 33, Te is the temperature of the heat absorber 9 which is detected by the heat absorber temperature sensor 48, Cpa is specific heat [kj/kg·K] of the air flowing into the radiator 4, ρ is a density (a specific volume) [kg/m³] of the air flowing into the radiator 4, and Qair is a volume [m³/h] of the air passing the radiator 4 (estimated from a blower voltage BLV of the indoor blower 27 or the like).

It is to be noted that in Equation (II), the temperature of the air flowing into the radiator 4 or the temperature of the air flowing out from the radiator 4 may be employed in place of or in addition to TCO or Te. Additionally, in Equation (III), the maximum heating capability predicted value without frosting TGQhpNfst may be corrected with reference to respective environmental conditions or external information such as time, the solar radiation amount detected by the solar radiation sensor 51, a rainfall, a location and a meteorological phenomenon, in addition to the outdoor air temperature Tam.

Figure 6:
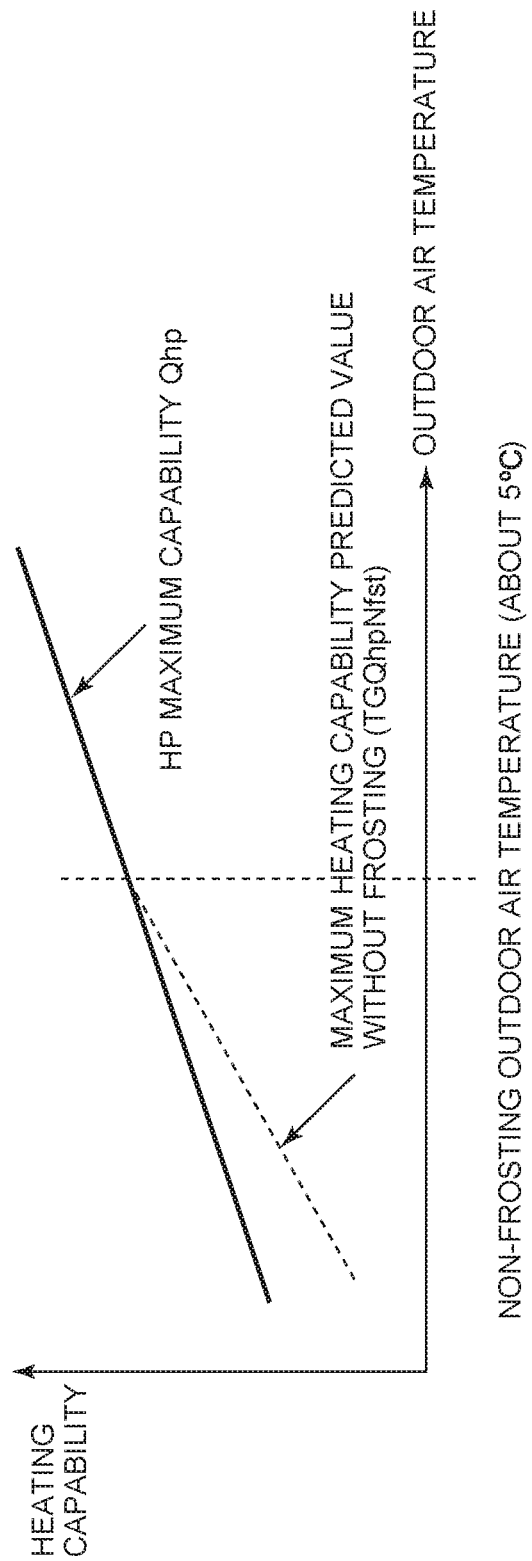
FIG. 6 is a diagram showing a relation between a maximum heating capability predicted value without frosting of a radiator at which an outdoor heat exchanger of FIG. 1 is not frosted and an outdoor air temperature.

FIG. 6 shows a relation between the maximum heating capability predicted value without frosting TGQhpNfst and the outdoor air temperature (a tendency of a change of the maximum heating capability predicted value without frosting). The maximum heating capability Qhp generable by the radiator 4 increases in proportion to a rise of the outdoor air temperature Tam. Further, when the outdoor air temperature at which the outdoor heat exchanger 7 is not frosted is about +5° C. and when the vehicle air conditioner is operated with the maximum heating capability Qhp as it is at +5° C. or less, the outdoor heat exchanger 7 is frosted, and hence, as shown by a broken line in FIG. 6, there is a tendency that the maximum heating capability predicted value without frosting TGQhpNfst decreases at a larger angle than the maximum heating capability Qhp, with drop of the outdoor air temperature.

The controller 32 calculates the maximum heating capability predicted value without frosting TGQhpNfst in accordance with Equation (III), and then calculates a target heating capability TGQHTR of the heating medium circulating circuit 23. The target heating capability TGQHTR of the heating medium circulating circuit 23 is calculated in accordance with Equation (IV) mentioned below.

$$TGQHTR=Qtgt-TGQhpNfst \quad (IV)$$

That is, the shortage of the maximum heating capability predicted value without frosting TGQhpNfst from the required heating capability Qtgt is defined as the target heating capability TGQHTR of the heating medium circulating circuit 23.

Next, the controller 32 compares the maximum heating capability predicted value without frosting TGQhpNfst with the required heating capability Qtgt, and in a case where the maximum heating capability predicted value without frosting TGQhpNfst is smaller than the required heating capability Qtgt (TGQhpNfst<Qtgt), the controller defines a target heating capability Qhpr of the radiator 4 as the maximum heating capability predicted value without frosting TGQhpNfst (Qhpr=TGQhpNfst), and the controller operates the compressor 2 and the other devices of the refrigerant circuit R so that the radiator 4 generates the maximum heating capability predicted value without frosting TGQhpNfst.

Furthermore, on the basis of outputs of the heating medium heating electric heater temperature sensor 50 and the heating medium-air heat exchanger temperature sensor 55, the controller 32 controls the energization to the heating medium heating electric heater 35 and the operation of the circulating pump 30 so that the target heating capability TGQHTR of the heating medium circulating circuit 23=the required heating capability Qtgt−the target heating capability Qhpr of the radiator 4 (the target heating capability Qhpr=the maximum heating capability predicted value without frosting TGQhpNfst). That is, the controller 32 complements the shortage of the maximum heating capability predicted value without frosting TGQhpNfst to the required heating capability Qtgt with the heating by the heating medium-air heat exchanger 40 of the heating medium circulating circuit 23. In consequence, comfortable heating of the vehicle interior can be achieved, and the frosting to the outdoor heat exchanger 7 can be prevented.

On the other hand, for example, when the outdoor air temperature is comparatively high and the maximum heating capability predicted value without frosting TGQhpNfst is the required heating capability Qtgt or more (Qtgt≤TGQhpNfst), the controller 32 stops the heating by the heating medium circulating circuit 23 (stops the circulating pump 30 and does not energize the heating medium heating electric heater 35 to stop HTR: TGQHTR=0), and operates the compressor 2 and the other devices of the refrigerant circuit R so that the radiator 4 generates the required heating capability Qtgt (Qhpr=Qtgt). In consequence, unnecessary heating by the heating medium circulating circuit 23 is avoided to prevent increase of power consumption.

(7) Preliminary Air Conditioning During Plug-in (Heating Mode)

Next, there will be described control of the heating medium circulating circuit 23 and the refrigerant circuit R when the above heating mode is defined during the plug-in of the vehicle (the electric car) and the vehicle interior is preliminarily air-conditioned (heated), with reference to FIG. 4 and FIG. 5.

The controller 32 can execute the heating mode also during the plug-in in which the vehicle is connected to the external power source and the battery is charged. In this case, in step S1 of FIG. 4, the controller 32 judges whether or not the vehicle is plugged in at present and whether or not there is a heating required by a user (an input operation to start the heating mode). First, in a case where the vehicle is not plugged in or a case where there is no heating required, the controller advances from the step S1 to step S13 to judge whether or not the outdoor heat exchanger 7 is frosted, and in a case where the outdoor heat exchanger is not frosted, the controller stops the operation of the vehicle air conditioner 1 in step S14. Additionally, in a case where the outdoor heat exchanger 7 is frosted, the controller advances to step S15, thereby shifting to the defrosting mode to execute a defrosting operation of the outdoor heat exchanger 7. It is to be noted that the frosting judgment of the outdoor heat exchanger 7 in the step S13 and the defrosting mode in the step S15 will be described later in detail.

On the other hand, in a case where the vehicle is plugged in at present and there is the heating required by the user, the controller 32 advances from the step S1 to step S2, reads data from each sensor, and judges whether or not the outdoor heat exchanger 7 is frosted, in step S3 in the same manner as in the step S13. During running before the vehicle is plugged in, water in the outdoor air adheres as frost to the outdoor heat exchanger 7 in the heating mode. When this frost grows, heat exchange between the outdoor heat exchanger 7 and the outdoor air to be passed is remarkably obstructed, and an air conditioning performance deteriorates.

(7-1) Frosting Judgment of Outdoor Heat Exchanger

In the step S3 (similarly to the step S13), the controller 32 judges (estimates) a frosting state to the outdoor heat exchanger 7 by frosting estimation means as its function. Next, a judgment example of the frosting state of the outdoor heat exchanger 7 will be described.

The controller 32 judges the frosting state of the outdoor heat exchanger 7 on the basis of a present refrigerant evaporation temperature TXO of the outdoor heat exchanger 7 which can be obtained from the outdoor heat exchanger pressure sensor 56 and a refrigerant evaporation temperature TXObase of the outdoor heat exchanger 7 in non-frosting when the outdoor air has a low humidity environment and the outdoor heat exchanger 7 is not frosted. In this case, the controller 32 determines the refrigerant evaporation temperature TXObase of the outdoor heat exchanger 7 in the non-frosting by use of Equation (V) mentioned below.

$$TXObase = f(Tam, NC, BLV, VSP) \quad (V)$$
$$= k1 \times Tam + k2 \times NC + k3 \times BLV + k4 \times VSP,$$

in which Tam which is a parameter of Equation (V) is the above outdoor air temperature which can be obtained from the outdoor air temperature sensor 33, NC is the number of revolution of the compressor 2, BLV is the blower voltage of the indoor blower 27, VSP is a velocity which can be obtained from the velocity sensor 52, and k1 to k4 are coefficients which are beforehand obtained by experiments.

The outdoor air temperature Tam is an index indicating a suction air temperature of the outdoor heat exchanger 7, and when the outdoor air temperature Tam (the suction air temperature of the outdoor heat exchanger 7) becomes lower, TXObase tends to be lower. Therefore, the coefficient k1 is a positive value. It is to be noted that the index indicating the suction air temperature of the outdoor heat exchanger 7 is not limited to the outdoor air temperature Tam.

Additionally, the number of revolution NC of the compressor 2 is an index indicating a refrigerant flow rate in the refrigerant circuit R, and when the number of revolution NC is higher (the refrigerant flow rate is larger), TXObase tends to be lower. Therefore, the coefficient k2 is a negative value.

Additionally, the blower voltage BLV is an index indicating the volume of the air to be passed through the radiator 4, and when the blower voltage BLV is higher (the volume of the air to be passed through the radiator 4 is larger), TXObase tends to be lower. Therefore, the coefficient k3 is a negative value. It is to be noted that the index indicating the volume of the air to be passed through the radiator 4 is not limited to this index, and may be a blower air volume of the indoor blower 27 or an opening SW of the air mix damper 28.

Additionally, the velocity VSP is an index indicating the velocity of the air to be passed through the outdoor heat exchanger 7, and when the velocity VSP is lower (the velocity of the air to be passed through the outdoor heat exchanger 7 is lower), TXObase tends to be lower. Therefore, the coefficient k4 is a positive value.

It is to be noted that during the plug-in, the velocity VSP is 0, and hence, in this case, an outdoor fan voltage FANVout of the outdoor blower 15 is substituted as the index indicating the velocity of the air to be passed through the outdoor heat exchanger 7. Additionally, in the embodiment, as the parameters of Equation (V), the outdoor air temperature Tam, the number of revolution NC of the compressor 2, the blower voltage BLV of the indoor blower 27 and the velocity VSP are used, but a load of the vehicle air conditioner 1 may be added as another parameter to these parameters. It is considered that indexes indicating this load are the target outlet temperature TAO, the number of revolution NC of the compressor 2, the blower air volume of the indoor blower 27, an inlet air temperature of the radiator 4 and the radiator temperature Tci of the radiator 4, and when the load is larger, TXObase tends to be lower. Furthermore, aging deterioration (the number of years of operation or the number of times of operation) of the vehicle may be added to the parameters. Additionally, the parameters of Equation (V) are not limited to all of the above parameters, and one of the parameters or any combination thereof may be used.

Next, the controller 32 calculates a difference ΔTXO (ΔTXO=TXObase−TXO) between the refrigerant evaporation temperature TXObase in non-frosting which can be obtained by substituting a present value of each parameter into Equation (V) and the present refrigerant evaporation temperature TXO, and the controller judges that the outdoor heat exchanger 7 is frosted, when there continues for, e.g., predetermined frosting state estimation time, a state where the refrigerant evaporation temperature TXO is lower than the refrigerant evaporation temperature TXObase in non-frosting and the difference ΔTXO is larger than a predetermined frosting detection threshold value ΔT1 (ΔTXO>ΔT1).

(7-2) Defrosting Mode of Outdoor Heat Exchanger

In a case where the outdoor heat exchanger 7 is frosted in the step S3 (similarly to the step S13), the controller advances to step S10 (similarly to the step S15) to execute the defrosting mode. In the defrosting mode of the step S10 (the step S15), the controller 32 opens the solenoid valve 24 and the solenoid valve 21, and closes the solenoid valve 22 and the solenoid valve 17. Further, the defrosting operation is performed to operate the compressor 2 by the power from the external power source or the power from the battery charged by the external power source. In consequence, the high-temperature high-pressure gas refrigerant (a hot gas) discharged from the compressor 2 flows through the solenoid valve 24 and the refrigerant pipe 13H, and directly flows into the outdoor heat exchanger 7 from the refrigerant pipe 13I through the check valve 45. Consequently, the outdoor heat exchanger 7 is heated, and hence, the frost is molten and removed.

The refrigerant flowing out from the outdoor heat exchanger 7 flows from the refrigerant pipe 13A through the solenoid valve 21 to enter the refrigerant pipe 13D, and flows through the refrigerant pipe 13B to be sucked into the compressor 2. Further, in a case where predetermined time elapses from the start of the defrosting mode, the controller 32 ends the defrosting mode to return to the step S1, and resets to the heating mode.

(7-3) Frosting Prediction of Outdoor Heat Exchanger

On the other hand, in a case where it is judged in the step S3 that the difference ΔTXO is the frosting detection threshold value ΔT1 or less (ΔTXO≤ΔT1) and that the outdoor heat exchanger 7 is not frosted, the controller 32 advances to step S4 to judge whether or not it is predicted that the outdoor heat exchanger 7 is frosted this time. FIG. 5 shows one example of a flowchart of the frosting prediction in the step S4.

Figure 5:
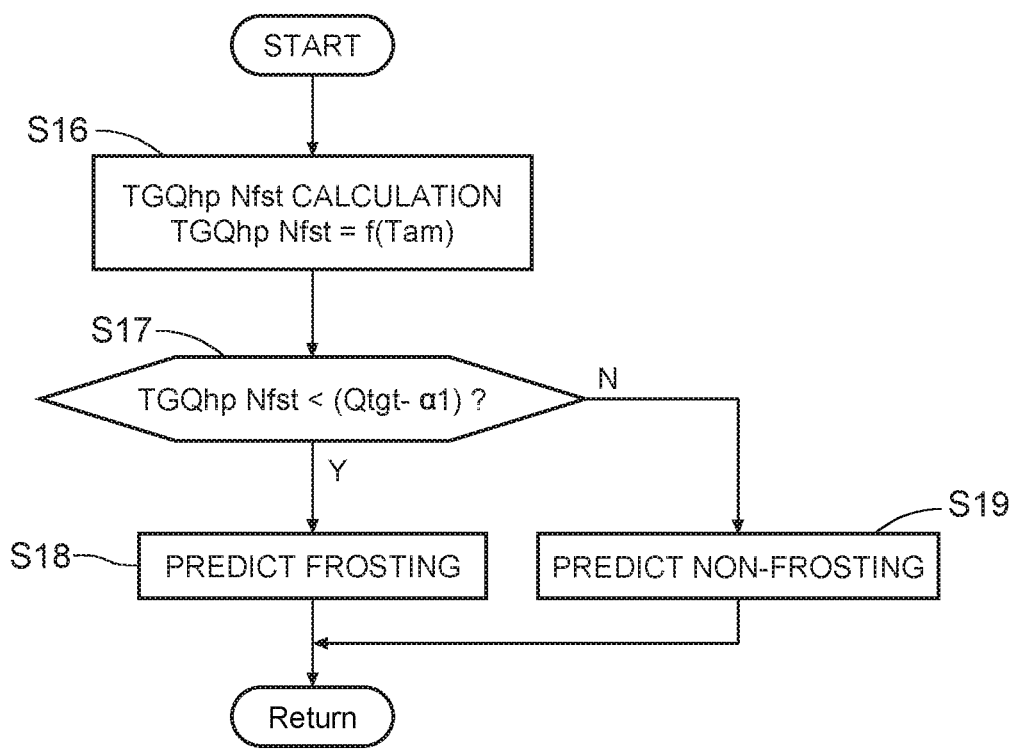
FIG. 5 is a flowchart of frosting prediction of the controller of FIG. 2 when a frost point cannot be detected.

First in step S16 of FIG. 5, the controller 32 calculates the maximum heating capability predicted value without frosting TGQhpNfst by the calculation of Equation (III) mentioned above. Next, the controller calculates the required heating capability Qtgt by (II) mentioned above, and in step S17, the controller judges whether or not the maximum heating capability predicted value without frosting TGQhpNfst is smaller than the required heating capability Qtgt−α1 (TGQhpNfst<(Qtgt−α1)). This α1 is a value to impart a margin to the frosting, and Qtgt−α1 is a value smaller than the required heating capability Qtgt but close thereto. It is to be noted that in a case where the margin is not required, α1=0 is defined and the judgment in the step S17 may be performed with TGQhpNfst<Qtgt.

Further, in a case where the maximum heating capability predicted value without frosting TGQhpNfst is smaller than the close value (Qtgt−α1) to the required heating capability in this embodiment, the controller advances to step S18 to predict that the outdoor heat exchanger 7 is frosted, when the heating is performed in the radiator 4 by the operation of the compressor 2. It is to be noted that in the case of TGQhpNfst (Qtgt−α1), the controller advances to step S19 to predict that the outdoor heat exchanger is not frosted.

Returning to FIG. 4, in a case where the controller 32 predicts in the step S18 that the outdoor heat exchanger is frosted, the controller advances from the step S4 to step S5 to calculate the required heating capability Qtgt by Equation (II) mentioned above again, and takes in a heating medium circulating circuit maximum heating capability QmaxHTR which is the maximum heating capability generable by the heating medium circulating circuit 23 in step S6. It is to be noted that the heating medium circulating circuit maximum heating capability QmaxHTR is beforehand set in the controller 32.

Next, in step S7, the controller 32 compares the required heating capability Qtgt with the heating medium circulating circuit maximum heating capability QmaxHTR. For example, in a case where the heating medium circulating circuit maximum heating capability QmaxHTR runs short to the required heating capability Qtgt in a cold season or the like (Qtgt>QmaxHTR), the controller advances to step S8 to calculate the target heating capability Qhpr of the radiator 4 which is a required heating capability for the radiator 4 by Equation (VI) mentioned below.

$$Qhpr = Qtgt - Q\max HTR \tag{VI}$$

That is, Equation (VI) obtains the shortage of the heating medium circulating circuit maximum heating capability QmaxHTR to the required heating capability Qtgt as the target heating capability Qhpr of the radiator 4.

Further, the controller 32 performs the heating of the vehicle interior by generated heat from the heating medium-air heat exchanger 40 of the heating medium circulating circuit 23 and the radiator 4 in step S9. In this case, the controller controls the energization to the heating medium heating electric heater 35 and the operation of the circulating pump 30 so that the target heating capability of the heating medium circulating circuit 23 is TGQHTR=the heating medium circulating circuit maximum heating capability QmaxHTR, and the controller also operates the compressor 2 and the other devices of the refrigerant circuit R so that the radiator 4 generates the target heating capability Qhpr (Qtgt−QmaxHTR).

That is, the controller 32 complements the shortage of the heating medium circulating circuit maximum heating capability QmaxHTR to the required heating capability Qtgt with the heating by the radiator 4 of the refrigerant circuit R. Consequently, preliminary air conditioning (the heating) of the vehicle interior is securely achieved. Additionally, at this time, the controller 32 limits the number of revolution of the compressor 2 to operate the compressor so that the refrigerant evaporation temperature TXO of the outdoor heat exchanger 7 is lower than the outdoor air temperature Tam and so that a difference therebetween is within a predetermined value A (a positive value) ((Tam−TXO)≤A). That is, when the refrigerant evaporation temperature TXO of the outdoor heat exchanger 7 is not excessively lower than the outdoor air temperature Tam and the heating by the heating medium circulating circuit 23 is complemented with the heating by the radiator 4, the frosting to the outdoor heat exchanger 7 is prevented.

It is to be noted that in a case where the required heating capability Qtgt cannot be satisfied due to this limit to the number of revolution of the compressor 2, an operation of lengthening preliminary air conditioning (heating) time to raise the temperature of the vehicle interior may be performed.

On the other hand, in a case where the heating medium circulating circuit maximum heating capability QmaxHTR satisfies the required heating capability Qtgt (Qtgt QmaxHTR) in the step S7, the controller advances to step S11, only performs the heating by the heating medium circulating circuit 23, and stops the compressor 2 of the refrigerant circuit R. In this case, the controller 32 defines the target heating capability TGQHTR of the heating medium circulating circuit 23 as the required heating capability Qtgt as in Equation (VII) mentioned below to control the energization to the heating medium heating electric heater 35 and the operation of the circulating pump 30.

$$TGQHTR = Qtgt \tag{VII}$$

Figure 4:
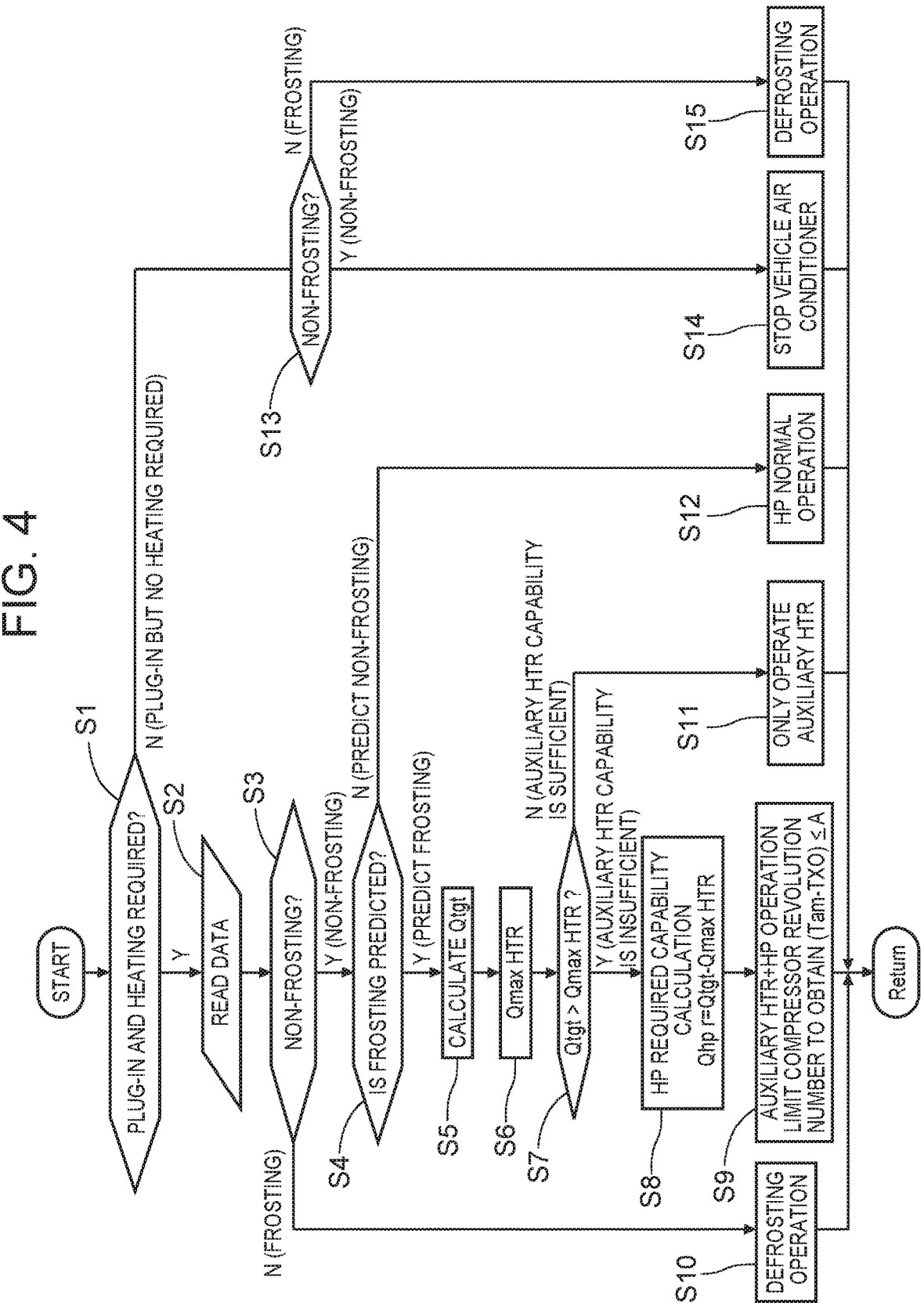
FIG. 4 is a flowchart to explain an operation of the controller of FIG. 2.

Additionally, in a case where it is predicted in the step S19 of FIG. 5 that the outdoor heat exchanger is not frosted, the controller 32 advances from the step S4 of FIG. 4 to step S12 to define the target heating capability Qhpr of the radiator 4=the required heating capability Qtgt, thereby operating the compressor 2, and executes the heating of the vehicle interior with a usual heat pump operation by the radiator 4. In this case, the heating by the heating medium circulating circuit 23 is stopped (the heating medium heating electric heater 35 and the circulating pump 30 are not energized).

As described above, when the heating mode is executed in the so-called plug-in state where the power is supplied from the external power source to the compressor 2 or to the battery which supplies the power to drive the compressor 2, the controller 32 executes the heating by the heating medium circulating circuit 23, in a case where the frosting to the outdoor heat exchanger 7 is predicted. Therefore, when the vehicle interior is beforehand heated (preliminary air conditioning) during the plug-in, the heating medium circulating circuit 23 performs the vehicle interior heating while preventing or inhibiting the frosting to the outdoor heat exchanger 7, and it is possible to decrease loads during the subsequent running. In consequence, it is possible to extend a running distance of the vehicle (the electric car or the hybrid car) while maintaining the vehicle interior after the start of the running at a comfortable temperature.

In this case, the controller 32 executes the heating by the radiator 4 in a case where the heating capability by the heating medium circulating circuit 23 runs short to the required heating capability Qtgt, so that it is possible to achieve so-called preliminary air conditioning (the heating) in a cold season or at night without hindrance. Additionally, in a case where the heating medium circulating circuit maximum heating capability QmaxHTR by the heating medium circulating circuit 23 satisfies the required heating capability Qtgt, the compressor 2 is not operated, and hence, the frosting to the outdoor heat exchanger 7 can securely be prevented.

Furthermore, the controller 32 compares the required heating capability Qtgt with the heating medium circulating circuit maximum heating capability QmaxHTR generable by the heating medium circulating circuit 23, and complements the shortage of the heating medium circulating circuit maximum heating capability QmaxHTR from the required heating capability Qtgt by the heating (Qhpr) of the radiator 4, so that it is possible to precisely achieve the complementing of the heating capability by the radiator 4.

Also in this case, the controller 32 controls the number of revolution of the compressor 2 so that the refrigerant evaporation temperature TXO in the outdoor heat exchanger 7 is lower than the outdoor air temperature Tam and a difference between the temperatures is within the predetermined value A, so that the frosting to the outdoor heat exchanger 7 can effectively be prevented or inhibited.

Additionally, the controller 32 executes the heating by the radiator 4 without performing the heating by the heating medium circulating circuit 23, in a case where it is predicted that the outdoor heat exchanger 7 is not frosted, so that saving of the power consumption for the heating during the plug-in can be achieved by the heat pump operation without hindrance.

Further, the controller 32 calculates the maximum heating capability predicted value without frosting TGQhpNfst which is the target value of the maximum heating capability generable by the radiator 4 in the range in which the outdoor heat exchanger 7 is not frosted, and the controller predicts that the outdoor heat exchanger 7 is frosted in the case where the maximum heating capability predicted value without frosting TGQhpNfst is smaller than the value close to the required heating capability Qtgt (or the required heating capability Qtgt), so that also in a case where a so-called frost point at which the outdoor heat exchanger 7 is frosted cannot be detected or a case where the frost point is not detected, it is possible to effectively prevent or inhibit the frosting to the outdoor heat exchanger 7 during the plug-in.

In this case, the controller 32 calculates the maximum heating capability predicted value without frosting TGQhpNfst on the basis of the outdoor air temperature Tam, or time, solar radiation, a rainfall, a location and weather conditions in addition to the outdoor air temperature. In consequence, the maximum heating capability predicted value without frosting TGQhpNfst at which the outdoor heat exchanger 7 is not frosted can precisely be estimated. That is, as a result, the frost point can precisely be estimated, thereby making it possible to further effectively prevent or inhibit the frosting to the outdoor heat exchanger 7 during the plug-in.

Additionally, in the embodiment, the auxiliary heating means is constituted of the heating medium circulating circuit 23 which has the heating medium-air heat exchanger 40 to heat the air to be supplied from the air flow passage to the vehicle interior, the heating medium heating electric heater 35, and the circulating pump 30 and which circulates the heating medium heated by the heating medium heating electric heater 35 through the heating medium-air heat exchanger 40 by the circulating pump 30, thereby making it possible to achieve electrically safer vehicle interior heating.

Embodiment 2

Figure 7:
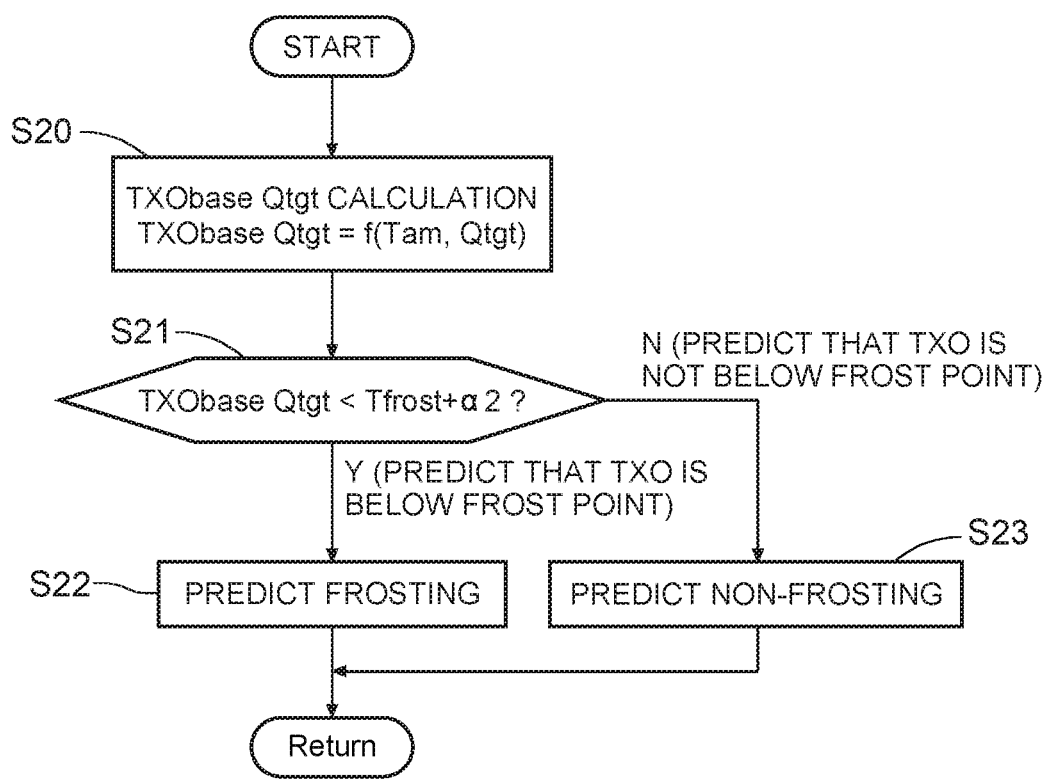
FIG. 7 is a flowchart of the frosting prediction of the controller of FIG. 2 when the frost point can be detected.

Next, FIG. 7 shows a flowchart of another embodiment of frosting prediction in the step S4 of FIG. 4 which is shown in FIG. 5. It is to be noted that another control is the same as in FIG. 1 to FIG. 6.

(7-4) Another Example of Frosting Prediction of Outdoor Heat Exchanger

In this case, first in step S20 of FIG. 7, a controller 32 predicts and calculates a required refrigerant evaporation temperature in non-frosting TXObaseQtgt which is a refrigerant evaporation temperature of an outdoor heat exchanger 7 to achieve a required heating capability Qtgt in non-frosting of the outdoor heat exchanger 7, i.e., when the outdoor heat exchanger 7 is not frosted, by use of Equation (VIII) mentioned below.

$$TXObaseQtgt = f(Tam, Qtgt) \quad \text{(VIII)},$$

in which Tam is the abovementioned outdoor air temperature detected by an outdoor air temperature sensor 33.

Additionally, in this embodiment, the controller 32 calculates a frost point Tfrost as a temperature of outdoor air around the outdoor heat exchanger 7 at which the outdoor heat exchanger 7 is frosted (a temperature at which a steam pressure in the outdoor air equals a saturated steam pressure of ice) from the outdoor air temperature Tam of a vehicle which is detected by the outdoor air temperature sensor 33 and an outdoor air humidity of the vehicle which is detected by an outdoor air humidity sensor 34. A calculating method of the frost point Tfrost is usual, and hence, the description thereof is omitted.

Further, it is judged in step S21 whether or not the required refrigerant evaporation temperature in non-frosting TXObaseQtgt is smaller than the frost point Tfrost+α2 (TXObaseQtgt<(Tfrost+α2)). This α2 is a value to impart a margin to the frosting, and Tfrost+α2 is a value higher than or close to the frost point Tfrost. It is to be noted that in a case where the margin is not required, α2=0 may be defined to judge TXObaseQtgt<Tfrost in the step S21.

Further, in this embodiment, in a case where the required refrigerant evaporation temperature in non-frosting TXObaseQtgt is smaller than the value (Tfrost+α2) close to the frost point, the controller advances to step S22 to predict that the outdoor heat exchanger 7 is frosted when heating is performed in a radiator 4 by an operation of a compressor 2. It is to be noted that in the case of TXObaseQtgt (Tfrost+α2), the controller advances to step S23 to predict that the outdoor heat exchanger is not frosted.

In this way, the controller 32 calculates the required refrigerant evaporation temperature in non-frosting TXObaseQtgt which is the refrigerant evaporation temperature of the outdoor heat exchanger when the required heating capability Qtgt is achieved, and predicts that the outdoor heat exchanger 7 is frosted in a case where the required refrigerant evaporation temperature in non-frosting TXObaseQtgt is lower than the frost point Tfrost or a temperature close to the frost point Tfrost. In consequence, on the basis of the frost point Tfrost at which the outdoor heat exchanger 7 is frosted, it is possible to effectively prevent or inhibit the frosting to the outdoor heat exchanger 7 during plug-in.

In this case, the controller 32 calculates the required refrigerant evaporation temperature in non-frosting TXObaseQtgt on the basis of the outdoor air temperature Tam and the required heating capability Qtgt, and hence, it is possible to precisely estimate the required refrigerant evaporation temperature in non-frosting TXObaseQtgt to achieve the required heating capability Qtgt when the outdoor heat exchanger 7 is not frosted, and it is possible to further effectively prevent or inhibit the frosting to the outdoor heat exchanger 7 during the plug-in.

Embodiment 3

Figure 8:
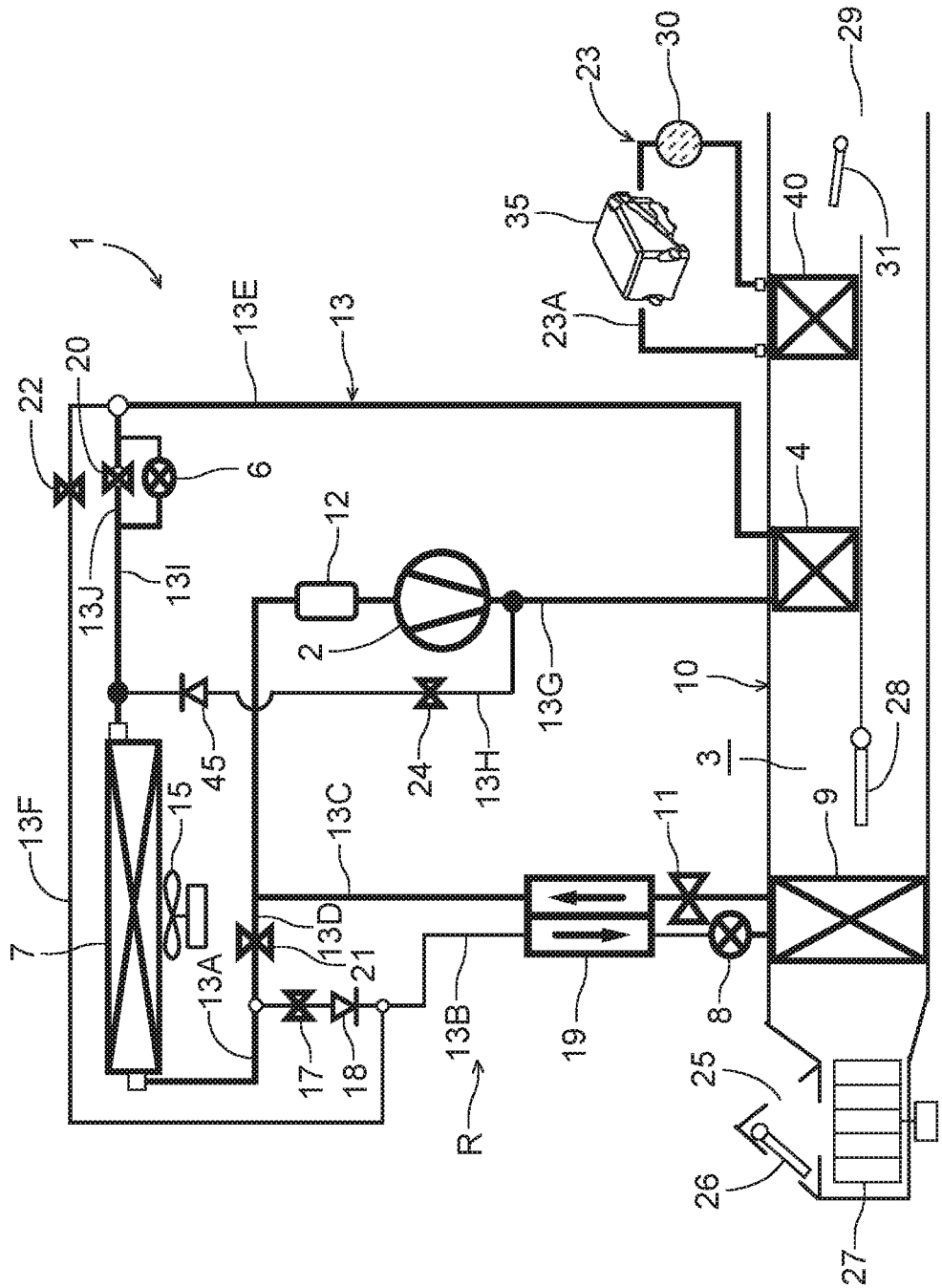
FIG. 8 is a constitutional view of a vehicle air conditioner of another embodiment to which the present invention is applied.

Next, FIG. 8 shows another constitutional view of the vehicle air conditioner 1 of the present invention. In this embodiment, in an outdoor heat exchanger 7, a receiver drier portion 14 and a subcooling portion 16 are not disposed, and a refrigerant pipe 13A extended out from the outdoor heat exchanger 7 is connected to a refrigerant pipe 13B via a solenoid valve 17 and a check valve 18. In addition, a refrigerant pipe 13D branched from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the vehicle air conditioner 1 of a refrigerant circuit R in which the outdoor heat exchanger 7 which does not have the receiver drier portion 14 and the subcooling portion 16 is employed in this manner.

Embodiment 4

Figure 9:
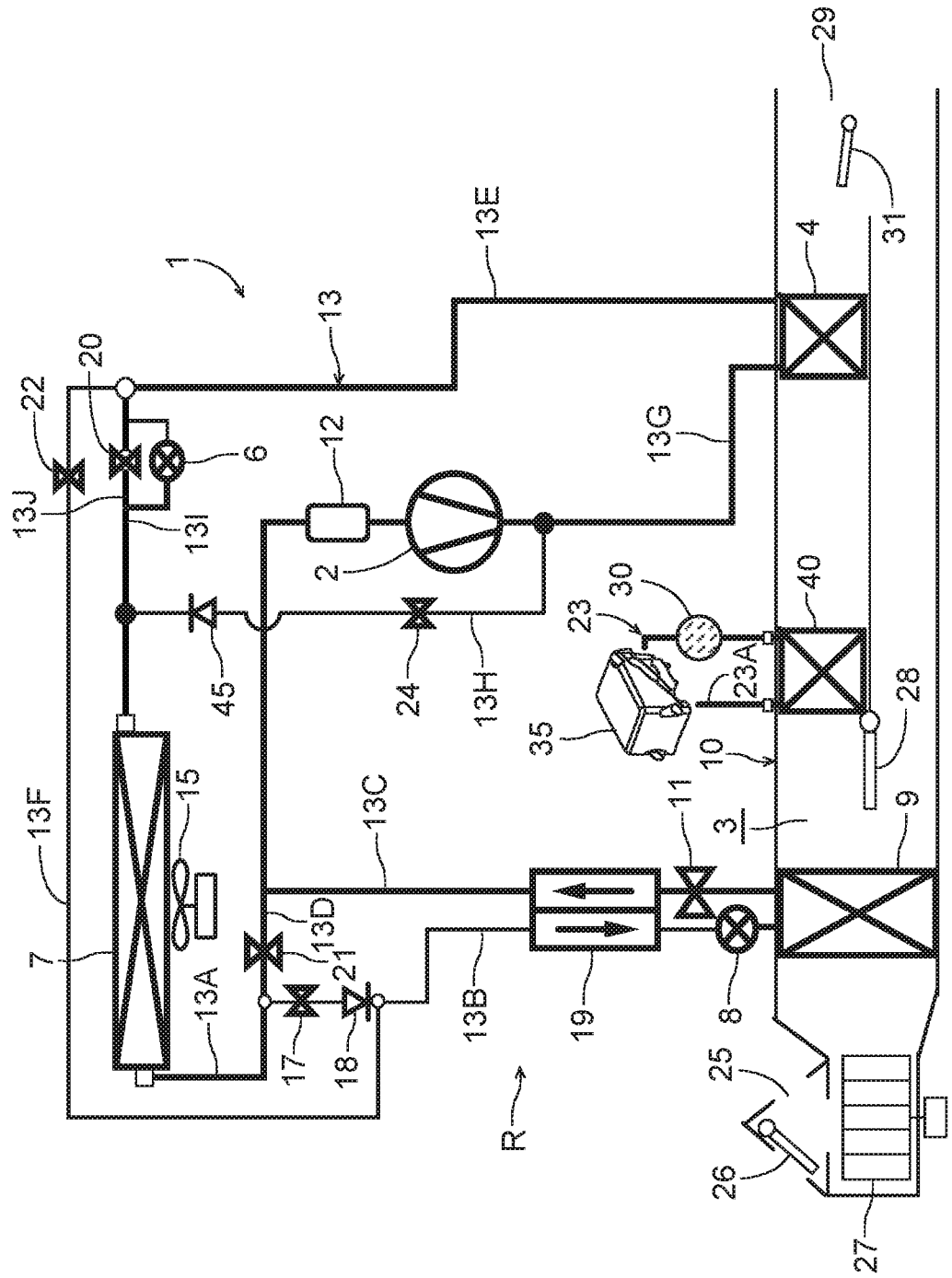
FIG. 9 is a constitutional view of a vehicle air conditioner of still another embodiment to which the present invention is applied.

Next, FIG. 9 shows still another constitutional view of the vehicle air conditioner 1 of the present invention. It is to be noted that a refrigerant circuit R of this embodiment is similar to FIG. 8. Additionally, in this case, a heating medium-air heat exchanger 40 of a heating medium circulating circuit 23 is disposed on an upstream side of a radiator 4 to flow of air of an air flow passage 3, which is a downstream side of an air mix damper 28. The other constitution is similar to FIG. 8.

In this case, the heating medium-air heat exchanger 40 is positioned on the upstream side of the radiator 4 in the air flow passage 3, and hence during an operation of the heating medium circulating circuit 23, the air is heated by the heating medium-air heat exchanger 40, and then flows into the radiator 4. The present invention is also effective in the vehicle air conditioner 1 in which the heating medium-air heat exchanger 40 is disposed on the upstream side of the radiator 4 in this manner, and especially in this case, any problems do not occur due to a low temperature of a heating medium in the heating medium circulating circuit 23. In consequence, coordinated heating with the radiator 4 is facilitated, and a so-called preliminary operation to heat the heating medium in advance is not required, but the air passed through the heating medium-air heat exchanger 40 flows into the radiator 4, and hence a temperature difference from the radiator 4 decreases, which causes the danger that a heat exchange efficiency deteriorates. On the other hand, when the heating medium-air heat exchanger 40 is disposed on the downstream side of the radiator 4 to the flow of the air of the air flow passage 3 as shown in FIG. 1 and FIG. 8, the air heated by the heating medium-air heat exchanger 40 does not flow into the radiator 4, and the temperature difference between the temperature of the radiator 4 and that of the air can be acquired to prevent deterioration of a heat exchange performance in the radiator 4, as compared with the case that the heating medium-air heat exchanger 40 is disposed on the upstream side of the radiator as shown in FIG. 9.

Embodiment 5

Figure 10:
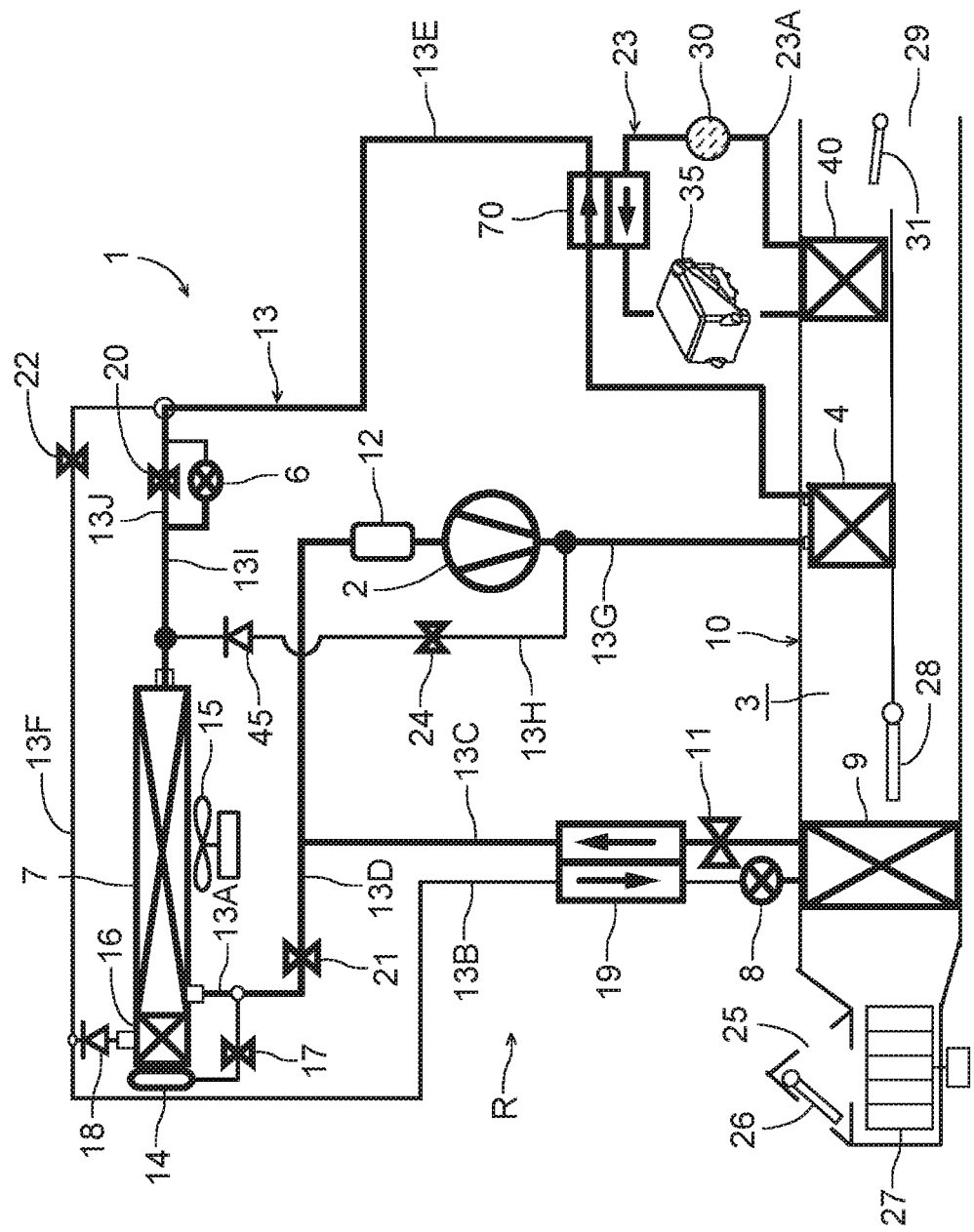
FIG. 10 is a constitutional view of a vehicle air conditioner of a further embodiment to which the present invention is applied.

Next, FIG. 10 shows a further constitutional view of the vehicle air conditioner 1 of the present invention. Basic constitutions of a refrigerant circuit R and a heating medium circulating circuit 23 of this embodiment are similar to those of FIG. 1, but in the heating medium circulating circuit 23, a heating medium-refrigerant heat exchanger 70 is disposed. The heating medium-refrigerant heat exchanger 70 performs heat exchange between a heating medium pipe 23A extended out from a circulating pump 30 and a refrigerant pipe 13E extended out from a radiator 4 of the refrigerant circuit R, and in the heating medium-refrigerant heat exchanger 70, a heating medium discharged from the circulating pump 30 is subjected to a heating operation from a refrigerant flowing out from the radiator 4. In consequence, heat can be collected from the refrigerant passed through the radiator 4 by the heating medium circulating through the heating medium circulating circuit 23.

Thus, in the heating medium circulating circuit 23, there is disposed the heating medium-refrigerant heat exchanger 70 which collects heat from the refrigerant passed through the radiator 4, and hence the heat which the refrigerant passed through the radiator 4 has is collected by the heating medium flowing in the heating medium circulating circuit 23 and conveyed to a heating medium-air heat exchanger 40, so that it is possible to more efficiently support the heating.

Embodiment 6

Figure 11:
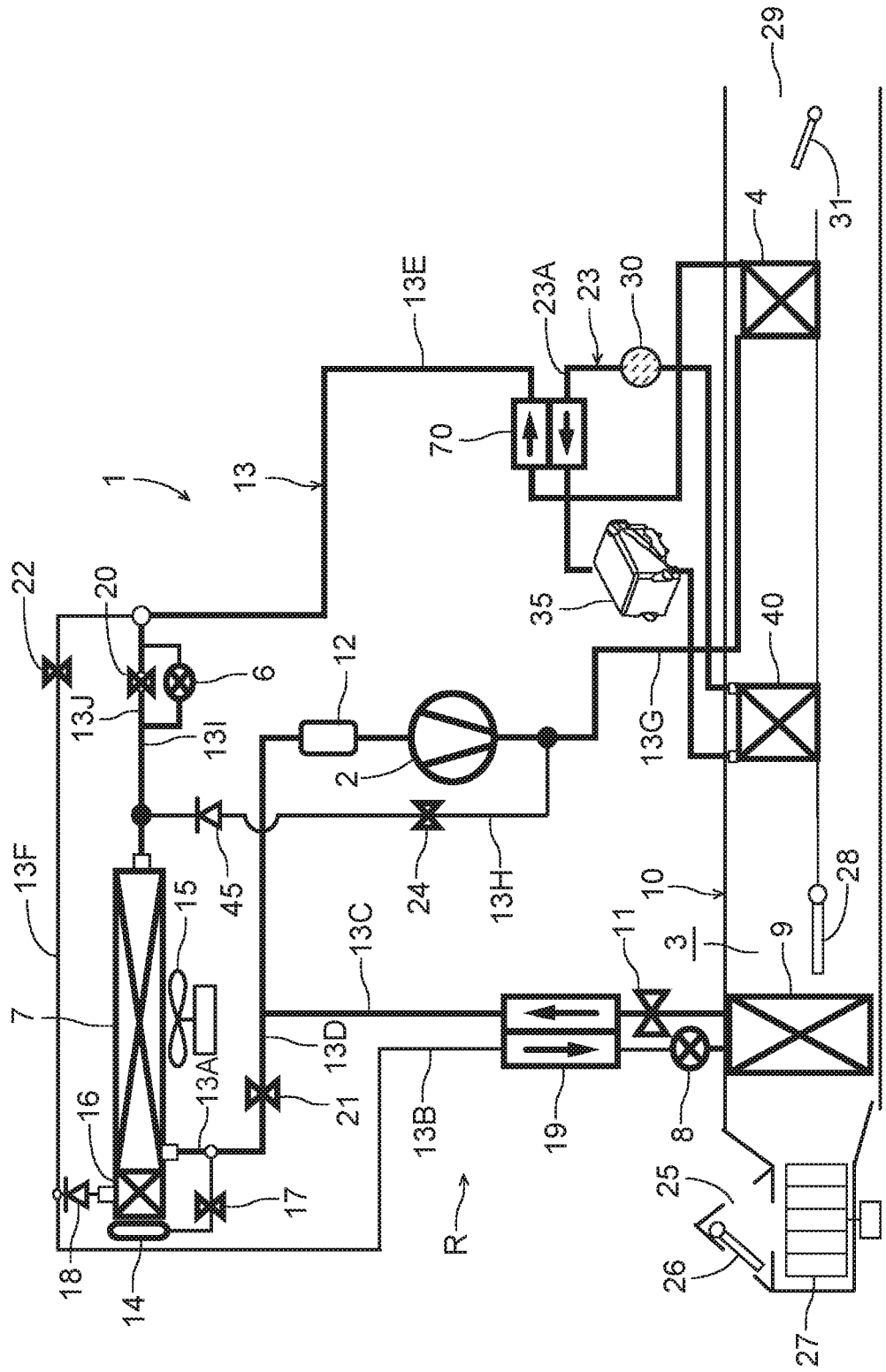
FIG. 11 is a constitutional view of a vehicle air conditioner of a further embodiment to which the present invention is applied.

Next, FIG. 11 shows a further constitutional view of the vehicle air conditioner 1 of the present invention. A refrigerant circuit R and a heating medium circulating circuit 23 of this embodiment are similar to those of FIG. 10, but a heating medium-air heat exchanger 40 of the heating medium circulating circuit 23 is disposed on an upstream side of a radiator 4 and a downstream side of an air mix damper 28 to flow of air of an air flow passage 3. Also according to such a constitution, heat which a refrigerant flowing out from the radiator 4 has is collected by a heating medium flowing in the heating medium circulating circuit 23 in a heating medium-refrigerant heat exchanger 70, and conveyed to the heating medium-air heat exchanger 40, so that it is possible to more efficiently support the heating.

Embodiment 7

Figure 12:
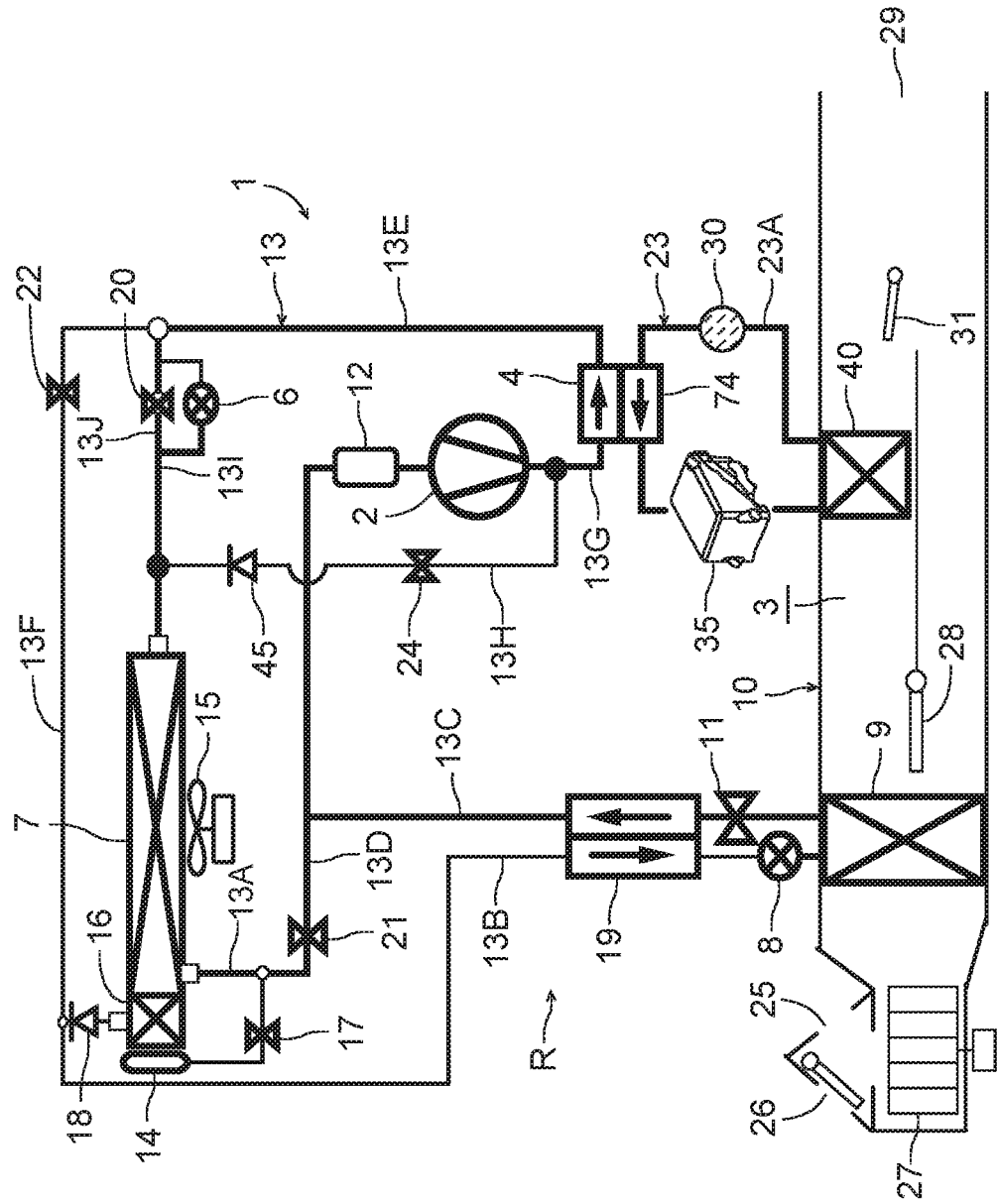
FIG. 12 is a constitutional view of a vehicle air conditioner of a further embodiment to which the present invention is applied.

Next, FIG. 12 shows a still further constitutional view of the vehicle air conditioner 1 of the present invention. Pipe constitutions of a refrigerant circuit R and a heating medium circulating circuit 23 of this embodiment are basically similar to those of FIG. 1, but a radiator 4 is not disposed in an air flow passage 3, and is disposed outside the air flow passage. Instead, a heating medium-refrigerant heat exchanger 74 in this case is disposed in a heat exchange relation in the radiator 4.

The heating medium-refrigerant heat exchanger 74 is connected to a heating medium pipe 23A between a circulating pump 30 of the heating medium circulating circuit 23 and a heating medium heating electric heater 35, and the heating medium-air heat exchanger 40 of the heating medium circulating circuit 23 is disposed in the air flow passage 3. According to such a constitution, there is performed heat exchange between a heating medium discharged from the circulating pump 30 and a refrigerant flowing through the radiator 4, and the heating medium is heated by the refrigerant, next heated by the heating medium heating electric heater 35 (in a case where the heater is energized to generate heat), and then radiates heat in a heating medium-air heat exchanger 40, thereby heating air to be supplied from the air flow passage 3 into a vehicle interior.

Also in the vehicle air conditioner 1 of such a constitution, when a heating capability by the radiator 4 runs short, the heating medium heating electric heater 35 is energized to heat the heating medium flowing in the heating medium pipe 23A, so that it is possible to support the heating and achieve electrically safer heating in the vehicle interior, as compared with a case where the electric heater is disposed in the air flow passage 3 as described later.

Embodiment 8

Figure 13:
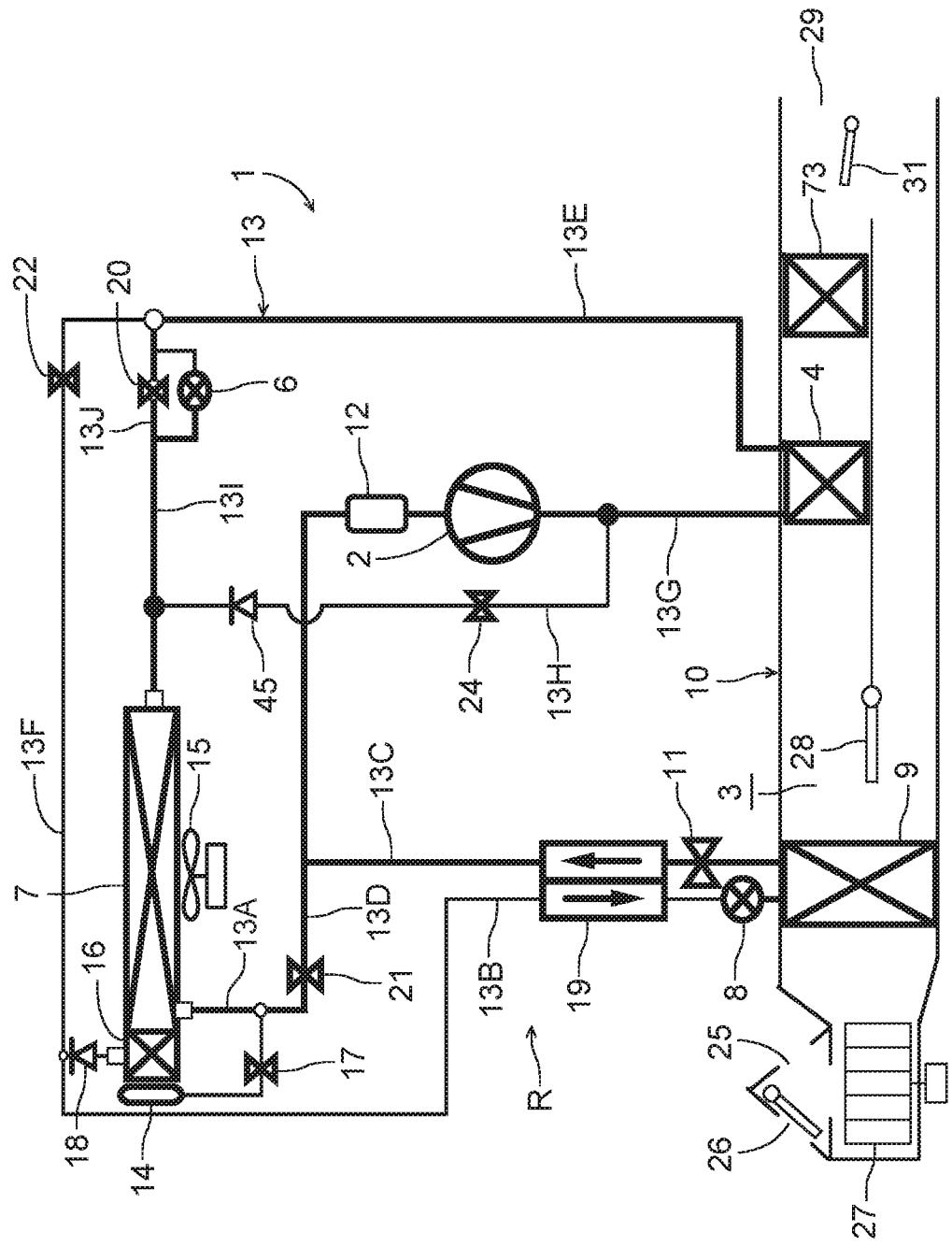
FIG. 13 is a constitutional view of a vehicle air conditioner of a further embodiment to which the present invention is applied.
Figure 14:
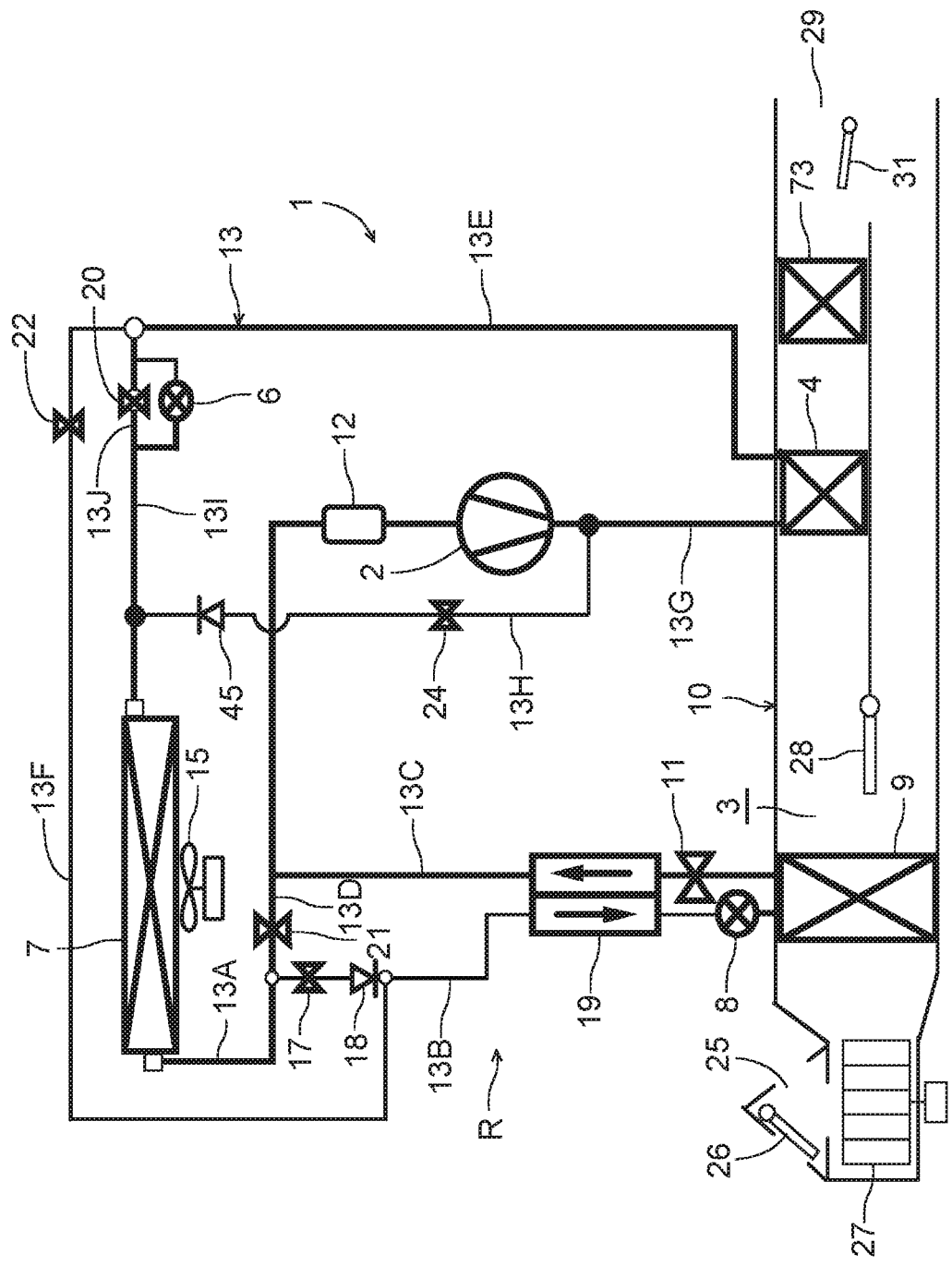
FIG. 14 is a constitutional view of a vehicle air conditioner of a still further embodiment to which the present invention is applied.

It is to be noted that, in the above respective embodiments, a heating medium circulating circuit 23 is employed as auxiliary heating means, but the auxiliary heating means may be constituted of a usual electric heater (e.g., a PTC heater) 73. FIG. 13 shows a constitutional example corresponding to FIG. 1 in this case, and FIG. 14 shows a constitutional example corresponding to FIG. 8. In FIG. 13 and FIG. 14, the heating medium circulating circuit 23 of FIG. 1 and FIG. 8 is replaced with the electric heater 73 in this case.

The other constitution and control are basically similar, and a controller 32 controls energization of the electric heater 73 in place of the circulating pump 30 and the heating medium heating electric heater 35 of the heating medium circulating circuit 23, to complement a heating capability of a radiator 4 by heat generated by the electric heater in the same manner as described above, so that detailed descriptions are omitted. Thus, air to be supplied into a vehicle interior may be heated by the electric heater 73, and such a constitution is advantageously simplified as compared with the case that the heating medium circulating circuit 23 is used.

Needless to say, the electric heater 73 may be disposed on an air upstream side of a radiator 4 of FIG. 13 or FIG. 14 as in the case of FIG. 9, and in this case, there is the effect that it is possible to eliminate the disadvantage that the temperature of the air to be supplied to the vehicle interior lowers in an initial stage of start of energization to the electric heater 73.

It is to be noted that in the embodiments, the controller 32 as the frosting estimating means of the outdoor heat exchanger 7 estimates the frosting to the outdoor heat exchanger 7 on the basis of the frost point Tfrost and the refrigerant evaporation temperature TXO of the outdoor heat exchanger 7 (the step S4 of FIG. 4), but the invention is not limited to the embodiments, and the estimating may be performed by a procedure similar to that of the case of Tfrost and TXO, on the basis of the refrigerant evaporation temperature TXO (or the refrigerant evaporation pressure PXO) of the outdoor heat exchanger 7 and, for example, the refrigerant evaporation temperature TXObase of the outdoor heat exchanger 7 in non-frosting (or the refrigerant evaporation pressure PXObase). In addition, for example, an actual heating capability which is the actual heating capability of the radiator 4 is compared with a heating capability in non-frosting which is the heating capability of the radiator 4 when the outdoor heat exchanger 7 is not frosted, and it may be estimated that the outdoor heat exchanger 7 is frosted, when the actual heating capability is lower than the heating capability in non-frosting.

Additionally, in the embodiments, the present invention is applied to the vehicle air conditioner 1 which changes and executes the respective operation modes of the heating mode, the dehumidifying and heating mode, the dehumidifying and cooling mode and the cooling mode, but the present invention is not limited to the embodiments, and the present invention is also effective for a vehicle air conditioner which only performs the heating mode.

Furthermore, the constitution or each numeric value of the refrigerant circuit R described in the above respective embodiments are not limited to the embodiments, and needless to say, they can be changed without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 20, 21, 22 and 24 solenoid valve
23 heating medium circulating circuit (auxiliary heating means)
26 suction changing damper
27 indoor blower (blower fan)
28 air mix damper
30 circulating pump (circulating means)
32 controller (control means)
35 heating medium heating electric heater (electric heater)
40 heating medium-air heat exchanger
R refrigerant circuit

The invention claimed is:
1. A vehicle air conditioner comprising:
a compressor which compresses a refrigerant;
an air flow passage through which air to be supplied to a vehicle interior flows;

a radiator which lets the refrigerant radiate heat to heat the air to be supplied from the air flow passage to the vehicle interior;

a heat absorber which lets the refrigerant absorb heat to cool the air to be supplied from the air flow passage to the vehicle interior;

an outdoor heat exchanger disposed outside the vehicle interior to let the refrigerant radiate heat or absorb heat; and control means, the vehicle air conditioner executing at least a heating mode in which the control means controls the flow of refrigerant such that the refrigerant discharged from the compressor radiates heat in the radiator, the refrigerant by which heat has been radiated decompresses, and then the refrigerant absorbs heat in the outdoor heat exchanger, the vehicle air conditioner comprising:
    auxiliary heating means for heating the air to be supplied from the air flow passage to the vehicle interior,
    wherein the control means has frosting estimation means for estimating frosting to the outdoor heat exchanger, and when the heating mode is executed in a state where power is supplied from an external power source to the compressor or a battery which supplies the power supplied from the external power source to drive the compressor, the control means executes the heating by the auxiliary heating means, in a case where the frosting to the outdoor heat exchanger is predicted on the basis of the estimation of the frosting estimation means,
    wherein the frosting estimation means calculates a required refrigerant evaporation temperature in non-frosting TXObaseQtgt which is a refrigerant evaporation temperature of the outdoor heat exchanger when a required heating capability Qtgt as the heating capability of the radiator which is required is achieved in non-frosting of the outdoor heat exchanger, and
    the frosting estimation means predicts that the outdoor heat exchanger is frosted in a case where the required refrigerant evaporation temperature in non-frosting TXObaseQtgt is lower than a frost point Tfrost or a temperature of Tfrost+$\alpha 2$, the $\alpha 2$ is a value to impart a margin to the frosting.

2. The vehicle air conditioner according to claim 1,
wherein the control means executes the heating by the radiator without performing the heating by the auxiliary heating means, in a case where it is predicted that the outdoor heat exchanger is not frosted, on the basis of the estimation of the frosting estimation means.

3. The vehicle air conditioner according to claim 1,
wherein the frosting estimation means calculates the required refrigerant evaporation temperature in non-frosting TXObaseQtgt on the basis of the outdoor air temperature and the required heating capability Qtgt.

4. The vehicle air conditioner according to claim 1,
wherein the auxiliary heating means is constituted of a heating medium circulating circuit which has a heating medium-air heat exchanger to heat the air to be supplied from the air flow passage to the vehicle interior, an electric heater, and circulating means and which circulates a heating medium heated by the electric heater through the heating medium-air heat exchanger by the circulating means.

\* \* \* \* \*